(12) United States Patent
Nishikawa

(10) Patent No.: US 6,421,685 B1
(45) Date of Patent: Jul. 16, 2002

(54) FILE DATA SYNCHRONIZATION IN TWO COMPUTER SYSTEMS

(75) Inventor: Hiroshi Nishikawa, Kawasaki (JP)

(73) Assignee: Canon Electronic Business Machines (H.K.) Co., Ltd., New Territories (HK)

( * ) Notice: Subject to any disclaimer, the term of this patent is extended or adjusted under 35 U.S.C. 154(b) by 0 days.

(21) Appl. No.: 09/386,222

(22) Filed: Aug. 31, 1999

(30) Foreign Application Priority Data

Aug. 31, 1998 (JP) .......................................... 10-246265

(51) Int. Cl.[7] .............................................. G06F 17/30
(52) U.S. Cl. .............................. 707/201; 707/2; 707/4; 707/5; 707/7; 707/103 Y; 709/103
(58) Field of Search ........................... 707/1, 200, 202, 707/103 Y, 2, 4, 5, 7; 709/103, 201

(56) References Cited

U.S. PATENT DOCUMENTS

| | | | | |
|---|---|---|---|---|
| 5,339,423 A | * | 8/1994 | Beitel et al. ................. 707/103 |
| 5,842,198 A | * | 11/1998 | Suzuki et al. .................. 707/2 |
| 5,905,990 A | * | 5/1999 | Inglett ........................ 707/200 |
| 5,922,054 A | * | 7/1999 | Bibayan ...................... 709/302 |
| 5,950,198 A | * | 9/1999 | Falls et al. .................... 707/8 |
| 6,014,519 A | * | 1/2000 | Egashira ........................ 717/9 |
| 6,138,126 A | * | 10/2000 | Hitz et al. .................. 707/202 |
| 6,148,334 A | * | 11/2000 | Imai et al. .................. 709/219 |
| 6,237,143 B1 | * | 5/2001 | Fontana et al. ............... 717/11 |

* cited by examiner

*Primary Examiner*—John Breene
*Assistant Examiner*—Cheryl Lewis
(74) *Attorney, Agent, or Firm*—Fitzpatrick, Cella, Harper & Scinto

(57) ABSTRACT

This invention provides a file control system which can reflect updated data in files of both a personal computer and portable information terminal, when data has been updated in one or both of them. This system is a file control system which has a personal computer apparatus and portable information terminal apparatus which can independently modify or edit data, and a connection means for connecting these apparatuses, and generates FILE-A.wlf for associating FILE-A.xls stored in the personal computer apparatus with FILE-A.pig stored in the portable information terminal. Data modifications in the associated files FILE-A.xls and FILE-A.pig are detected, and the detection result is reflected in FILE-A.wlf (third file). Data of both files FILE-A.xls and FILE-A.pig are matched on the basis of FILE-A.wlf in which the detection result is reflected. Furthermore, calculation formulas embedded in FILE-A.xls are applied to the updated data of FILE-A.xls to further update FILE-A.xls.

21 Claims, 33 Drawing Sheets

WOLF MANAGEMENT FILE

| | | | FILE NAME | FILE NUMBER |
|---|---|---|---|---|
| EXCEL AREA | DIRECTORY AREA | FILE A RECORD<br>FILE B RECORD<br>⋮ | FILE A.xls<br>FILE B.xls | xxxxxx1<br>xxxxxx2 |
| | SHEET DATA AREA | FILE A RECORD<br>FILE B RECORD<br>⋮ | | |
| WOLF AREA | DIRECTORY AREA | FILE A RECORD<br>FILE B RECORD<br>⋮ | FILE A.xls<br>FILE B.xls | xxxxxx1<br>xxxxxx2 |
| | SHEET DATA AREA | FILE A RECORD<br>FILE B RECORD<br>⋮ | | |
| PIG AREA | DIRECTORY AREA | FILE A RECORD<br>FILE B RECORD<br>⋮ | FILE A.xls<br>FILE B.xls | xxxxxx1<br>xxxxxx2 |
| | SHEET DATA AREA | FILE A RECORD<br>FILE B RECORD<br>⋮ | | |

FIG. 4
WOLF MANAGEMENT FILE

| | | | FILE NAME | FILE NUMBER |
|---|---|---|---|---|
| EXCEL AREA | DIRECTORY AREA | FILE A RECORD<br>FILE B RECORD ... | FILE A.xls<br>FILE B.xls | xxxxxx1<br>xxxxxx2 |
| | SHEET DATA AREA | FILE A RECORD<br>FILE B RECORD ... | | |
| WOLF AREA | DIRECTORY AREA | FILE A RECORD<br>FILE B RECORD ... | FILE A.xls<br>FILE B.xls | xxxxxx1<br>xxxxxx2 |
| | SHEET DATA AREA | FILE A RECORD<br>FILE B RECORD ... | | |
| PIG AREA | DIRECTORY AREA | FILE A RECORD<br>FILE B RECORD ... | FILE A.xls<br>FILE B.xls | xxxxxx1<br>xxxxxx2 |
| | SHEET DATA AREA | FILE A RECORD<br>FILE B RECORD ... | | |

FIG. 5

| |
|---|
| FILE NAME |
| FILE NUMBER |
| FILE SIZE |
| FILE CREATION DATA |
| SERIAL NUMBER |

FIG. 7

|        |               | EXCEL | WOLF | PIG | LATEST |
|--------|---------------|-------|------|-----|--------|
| CASE 1 | FILE NAME     | A     | A    | A   | PIG    |
|        | SERIAL NUMBER | 10    | 15   | 20  |        |
| CASE 2 | FILE NAME     | B     | B    | B   | EXCEL  |
|        | SERIAL NUMBER | 31    | 28   | 30  |        |
| CASE 3 | FILE NAME     | B     | B    | B   | EXCEL  |
|        | SERIAL NUMBER | 31    | 28   | 30  |        |

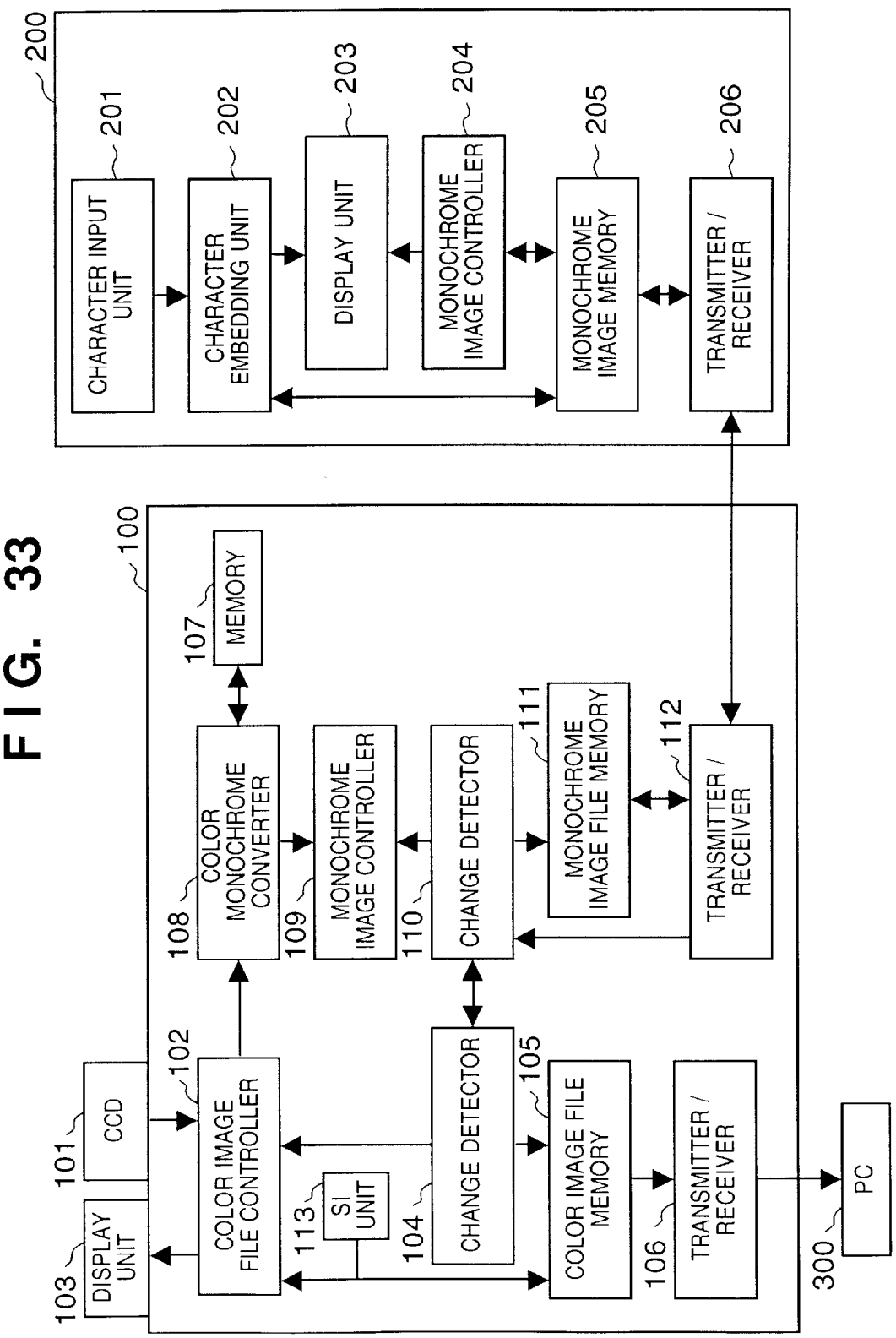

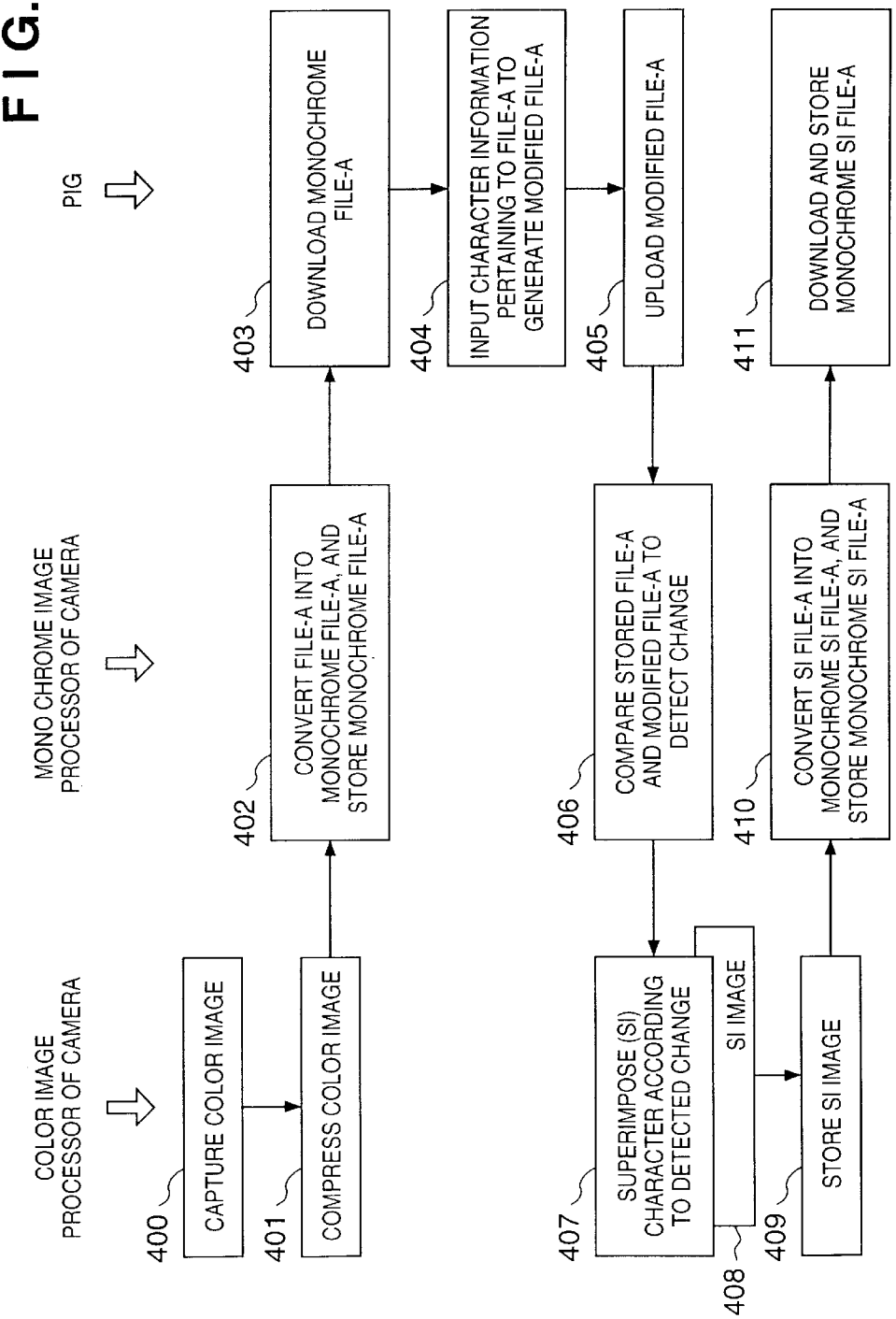

FILE DATA SYNCHRONIZATION IN TWO COMPUTER SYSTEMS

BACKGROUND OF THE INVENTION

The present invention relates to a file control system and file update method, which synchronize the data update contents of files present in different data processing apparatuses and, more particularly, to synchronization of the date update contents between a personal computer as a host system and a portable information terminal (Personal Digital Assistant: PDA).

The present invention also relates to a terminal apparatus or personal computer using such system and method.

Conventionally, data are exchanged between the host and terminal apparatuses or between the host apparatuses in one way or two ways. In case of one-way exchange, the host apparatus sends data to the terminal apparatus in one way or vice versa. In one-way exchange, whole data are rewritten irrespective of whether or not data are effective on the receiving side.

In two-way exchange, when data update has taken place in one of the host and terminal apparatuses, control is made to send the data-updated, new file to the other. Especially, in case of a spreadsheet file, since data are independently updated in files on both the sides in units of cells, common files, which reflect both data updates in units of cells, are separately prepared, and are reflected in the files of the personal computer and PDA.

However, in order to synchronize the data update contents between the host and terminal apparatuses, a program for controlling files on the host apparatus side to synchronize the data update contents is normally supplied from a manufacturer, which supplies the terminal apparatus.

More specifically, an application program on the host apparatus side is supplied by company A, and the terminal apparatus is supplied by company B. A function of downloading a file created by that application program to the terminal apparatus, and allowing the terminal apparatus to access the downloaded file is appended to the terminal apparatus. In order to reflect a file, whose data have been updated on the terminal apparatus, in the host apparatus, a control program supplied by company B must be installed on the terminal apparatus, and is running on the terminal apparatus. Then, data are updated on the host side in collaboration between that control program and the application program.

However, since the control program is normally supplied by the developer of the terminal apparatus, it supports the data update function of only files created by application program X, compatibility with which the developer especially intends, and by application program Y which has data compatibility with program X. That is, application programs have no versatility of the data update function. More specifically, some terminal apparatuses cannot exchange files created by international standard spreadsheet programs such as EXCEL available from Microsoft Corp., Lotus 123 available from Lotus Corp., and the like in fact.

Although a terminal apparatus that has versatility in the data update function has been provided, very troublesome operations are required to perform that function.

On the other hand, files handled by multi-functional programs such as EXCEL, Lotus 123, and the like have a large size since they include data containing various attributes. Therefore, upon transferring such file to the terminal apparatus, the terminal apparatus must have a large data storage memory. Or when a high-resolution color image such as a color image sensed by a digital camera is to be transferred, it is a common practice to transfer such image after the image is compressed. In such case, the terminal apparatus must have a memory for storing a decompression program and a high-speed CPU that attains high-speed decompression.

In this manner, a large-size memory and high-speed CPU, which are required to keep compatibility with files created by multi-functional programs or to keep compatibility with a high-resolution image file, lead to an increase in cost of the terminal apparatus. Such increase in cost is a serious problem in a portable information terminal or electronic notebook that attaches an importance on low cost.

SUMMARY OF THE INVENTION

It is the first object of the present invention to provide a file control system which can reflect updated data in files in two file apparatuses by simple operation when one or both of a first file apparatus such as a host apparatus or the like and a second file apparatus such as a portable information terminal or the like have updated data.

It is the second object of the present invention to provide a file control system which can also update data attributes of a file to be updated.

In order to achieve the first object, as recited in claim 1, a file control system which comprises first and second file apparatuses that can independently modify or edit data, and connection means for connecting the first and second file apparatuses as needed to be able to exchange data, comprises:

associating means, provided in the first file apparatus, for generating a third file for associating a first file stored in the first file apparatus with a second file stored in the second file apparatus;

detection means for detecting a data modification in the associated first and second files, and reflecting a detection result in the third file;

matching means for matching first data present in both the first and second files with each other on the basis of the third file in which the detection result is reflected; and means for updating and modifying second data present in the first file on the basis of the third file in which the detection result is reflected.

The present invention is suitable for updating information between a personal computer and a portable information terminal. Hence, according to claim 2 as a preferred aspect of the present invention, the first file apparatus comprises a disk device managed by a personal computer operating system of a personal computer apparatus, and the second file apparatus comprises a portable information terminal apparatus.

According to claim 3 as a preferred aspect of the present invention, the first and second files are spreadsheet files having identical data structures. Since the spreadsheet file has a cell structure, data of the two files can be easily synchronized.

Update of two files is significant only when the two files exist. Therefore, in the initial state, the other file must be generated based on one file. Hence, according to claim 4 as a preferred aspect of the present invention, the associating means generates the third file when data of the first file is newly transferred to the second file apparatus via the connection means.

According to claim 5 as a preferred aspect of the present invention, a first file control program can be executed in the first file apparatus, and a second file control program can be executed in the second file apparatus.

Update is preferably started simply. Hence, according to claim 6 as a preferred aspect of the present invention, the detection means and the matching means are started by a start button provided to the second file apparatus.

According to claim 7 as a preferred aspect of the present invention, the connection means includes a communication cable.

It is important upon matching and synchronizing data to precisely detect data modification in two files. Hence, according to claim 8 as a preferred aspect of the present invention, the detection means comprises:

a first management file which is provided in the first file apparatus to store first count information indicating a modification count of the first file in the first file apparatus;

a second management file which is provided in the first file apparatus to store second count information indicating a modification count of the second file in the second file apparatus; and means for checking a latest modified file by comparing the first count information and second count information.

In some cases, data in both the first and second files may be updated. In order to precisely detect such modifications in two files, according to claim 9 as a preferred aspect of the present invention, the detection means comprises a register for storing count information upon previous matching. The current count information can be compared with that upon previous matching in units of files, and it can be checked in units of files if data has been modified.

The functions of the present invention are preferably implemented by another program rather than the program that directly handles the first and second files. Hence, according to claim 10 as a preferred aspect of the present invention, the system further comprises a file management program running in the first file apparatus, and wherein the file management program manipulates a first management information file for the first file, a second management information file for the second file, and a third management information file that mediates the first and second management information files. Since the file management program as the other program can indirectly control the first and second files via the third management information file, it is not restrained by the states of the first and second files.

According to claim 11 as a preferred aspect of the present invention, the third file does not contain attribute information of data of the first file. This can reduce a necessary memory size.

According to claim 12 as a preferred aspect of the present invention, energization of the connection means is started by the second file apparatus, e.g., the start switch of the second file apparatus.

If the file is a spreadsheet file, it is preferably updated in units of cells. Hence, according to claim 13 as a preferred aspect of the present invention, modifications in units of cells in the first file are reflected in the third file.

When data have been modified at identical addresses in two spreadsheet files, it cannot be determined to which modification priority is given. Hence, according to claim 14 as a preferred aspect of the present invention, the system further comprises arranging means for, when the first and second files are changed at identical cell addresses, arranging a priority order of modifications of the first and second files.

According to claim 15 as a preferred aspect of the present invention, the system further comprises means for outputting a message indicating that the first and second files are changed at identical cell addresses.

According to claim 16 as a preferred aspect of the present invention, the system further comprises means for, when the first and second files are changed at identical cell addresses, outputting a message inquiring a priority order of modifications of the first and second files.

According to the present invention, as recited in claim 17, the second data is a calculation formula appended to the first data.

The present invention is preferably a personal computer having the first file apparatus.

The first objective is also achieved by a portable information terminal in which a program having a spreadsheet function is installed, comprising:

means for storing a modification count of spreadsheet data when the program is running; and communication means for communicating with an external host apparatus to exchange data of the program and the count data.

The first to third objectives of the present invention are also achieved by a file update method for supporting data update of a first data accumulation program for accumulating data, and the method comprises:

the step of managing a first file for storing first information, which reflects an accumulation result of accumulation data generated upon execution of the first data accumulation program on a computer;

the step of externally receiving second information, which reflects an accumulation result of accumulation data generated in accordance with an execution result of an externally executed second data accumulation program, and managing the second information as a second file; and the step of updating an output file of the first data accumulation program on the basis of the first information and second information.

According to claim 23 as a preferred aspect of the present invention, the method further comprises:

the step of generating fifth information which mediates the first information and second information;

the step of storing the fifth information; and the step of generating data of the output file via the third information.

According to claim 24 as a preferred aspect of the present invention, the method further comprises:

the step of generating sixth information for updating an external output file of the second data accumulation program on the basis of the first information and second information; and the step of externally outputting the sixth information via a communication line.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a table showing the structure of a WOLF management file in the first embodiment;

FIG. 5 is a table for explaining the directory structure;

FIG. 7 is a table for explaining old and new data updates;

FIG. 33 is a diagram showing the arrangement of a file processing system in the fourth embodiment; and FIG. 34 is a block diagram showing operations in the fourth embodiment.

DETAILED DESCRIPTION OF THE INVENTION

The preferred embodiments of the present invention will be described hereinafter with reference to the accompanying drawings. Note that the following embodiments will exemplify a portable electronic apparatus. However, as can be seen from the following description, the present invention is not limited to such specific apparatus, and can be applied to any other electronic apparatuses.

<First Embodiment>

The first embodiment is related to data exchange for data update between a host apparatus and a portable information terminal which can be connected to the host apparatus via a connector cable (or a radio communication, infrared communication, or the like).

A system of the first embodiment shown in FIG. 1 has a personal computer (to be abbreviated as a "PC" hereinafter) serving as a host apparatus, and a PIG (an abbreviation for "Personal Information Guide, i.e., a data processing apparatus which can store data received from the PC, and can refer to and process the data), and a cable for connecting the PC and PIG. The cable is arbitrarily detachable, and is connected to serial interfaces of the PC and PIG.

Figure 2:
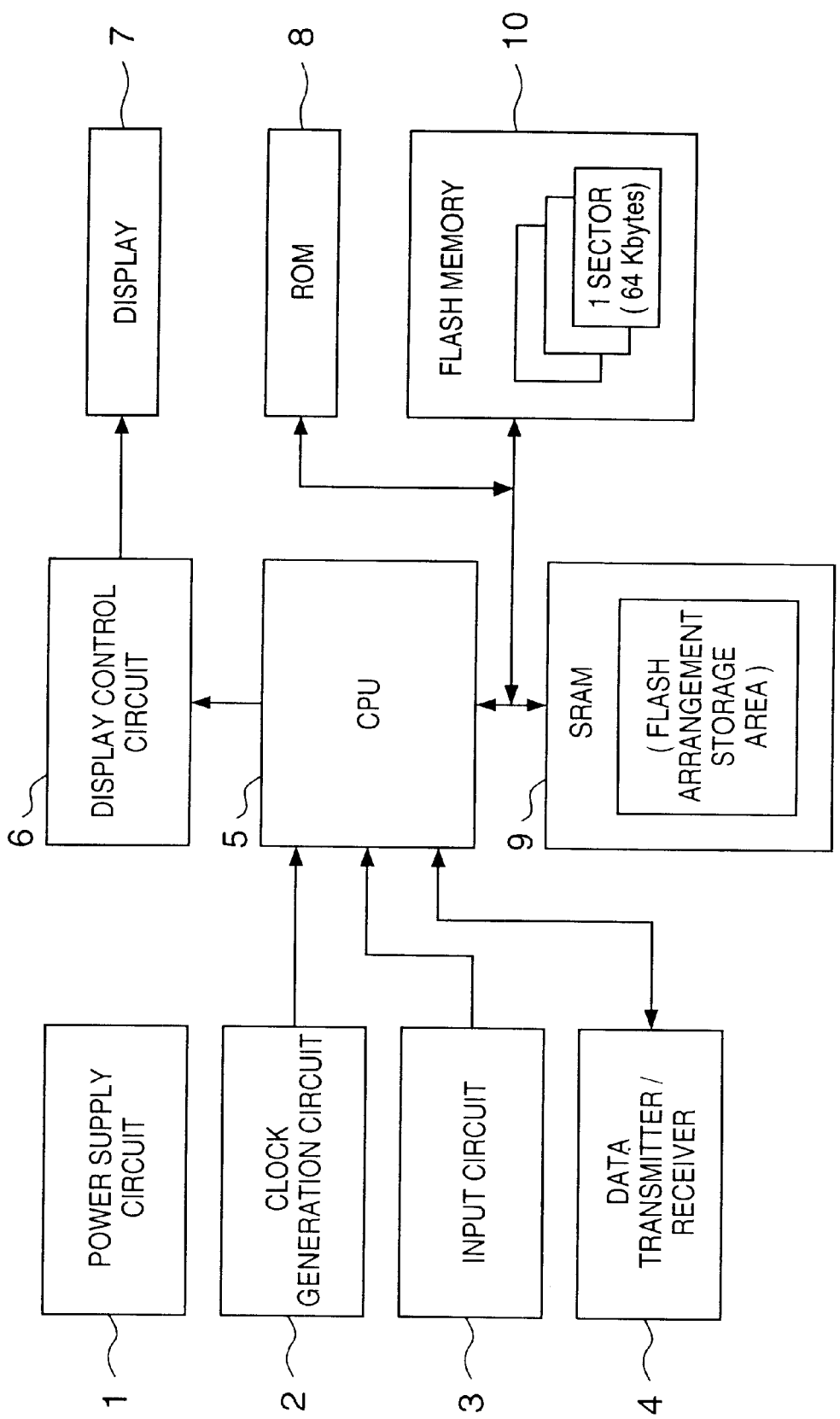
FIG. 2 is a block diagram showing the arrangement of a portable information terminal used in the second embodiment.

FIG. 2 is a block diagram showing the arrangement of the PIG. Referring to FIG. 2, reference numeral 1 denotes a power supply circuit for generating a voltage to be supplied to semiconductor devices such as a CPU flash memory, SRAM, ROM, CPU, and the like (to be described later), a voltage for a display, a voltage for data communications, and the like. Reference numeral 2 denotes a clock generation circuit for generating high-speed clocks for data processing control, low-speed clocks for time counting, low-speed clocks for display, and low-speed clocks for data communications of the CPU (to be described later). Reference numeral 3 denotes an input circuit using a touch panel, which sends a result obtained by detecting the position on the touch panel and converting it into digital data to the CPU, and makes the CPU start its control processes in response to that result as a trigger.

Reference numeral 4 denotes a data transmitter/receiver, which includes a voltage conversion connector cable for control and data signals, upon receiving data from an external apparatus and storing the received data in a flash memory 10 under the control of a CPU 5, or outputting a data file stored in the flash memory 10 under the control of the CPU 5. The data transmitter/receiver 4 is connected to the PC via the aforementioned cable, and transfers input data to the host computer or verse versa.

The central processing unit (CPU) 5 executes data processing control on the basis of information received from the input circuit 3 and data transmitter/receiver 4 in accordance with a program of a processing sequence stored in a ROM 8 (to be described later).

Reference numeral 6 denotes a display control circuit for storing display data of the data processing control results in the CPU 5, and sequentially outputting the display data to a display on the basis of a display timing signal, and for generating a display voltage on the basis of the voltage supplied from the power supply circuit 1, and supplying that voltage to the display.

Reference numeral 7 denotes an LCD display using a liquid crystal display technique, which displays display data received from the display control circuit. As described above, the touch panel is provided to the front surface of this display 7, which can operate as if the user were writing on paper, since the touch panel sequentially detects positions handwritten with a pen (not shown), and displays a locus as the detection results on the display 7.

Reference numeral 8 denotes a read-only memory (ROM) which stores various application programs, a memory control program, and font data.

Reference numeral 9 denotes an SRAM used as a work memory of the CPU. The SRAM 9 stores flags that store various states and tentative data, and is allocated with an area (flash arrangement memory area 9*a*) for temporarily storing data for one sector of the flash memory when data is erased or added/modified on the flash memory.

Reference numeral 10 denotes a 1-Mbyte flash memory for storing a data file, which has 16 sectors (64 kbytes per sector=rewrite unit).

For the sake of simplicity, in the first embodiment, assume that the PC is an arbitrary personal computer which operates in a WINDOWS (available from Microsoft Corp.) environment, and in addition to the WINDOWS system as an operating system, an EXCEL system as a spreadsheet program available from Microsoft Corp., and a system (to be referred to as a "WOLF" hereinafter) for storing file data from the EXCEL in a management file (to be described later) to be managed uniquely so as to allow editing of the file data, and managing data exchange with the PIG are installed in advance in the PC.

The EXCEL system consists of an EXCEL program 11 and EXCEL management file 12 (stored on a storage medium (not shown) such as a hard disk or the like). The WOLF system consists of a WOLF management file 14, WOLF file management program 13, and WOLF file communication program 15.

The WOLF management file 14 is acquired (imported) by the WOLF file management program 13 from a file created by the EXCEL except by removing calculation formulas and attributes of a graph portion, and since the attributes are removed, the WOLF management file 14 can be easily exchanged with the PIG. The WOLF file management program 13 manages processes for storing data received (uploaded) from the PIG as a file, and outputting (exporting) that file to the EXCEL. Also, the WOLF file management program 13 detects an updated portion of data received from the PIG together with the WOLF file communication program 15, synthesizes the updated portion with old data, and exports the synthesized data to the EXCEL. Also, the WOLF file management program 13 detects an updated data portion in the EXCEL management file 12 together with the WOLF management file 14, synthesizes the updated data portion with old data, and sends (downloads) the synthesized data to the PIG.

The WOLF file communication program 15 is a data communication control section of the WOLF file management program 13, which converts data in the WOLF management file 14 into a format that can be exchanged, and passes the converted data to a BIOS 16 of the PC. The WOLF file communication program 15 receives incoming data from the PIG via the BIOS 16, converts the format of the received data into a format that can be stored as a file, and stores the converted data in the WOLF management file 14.

Figure 3:
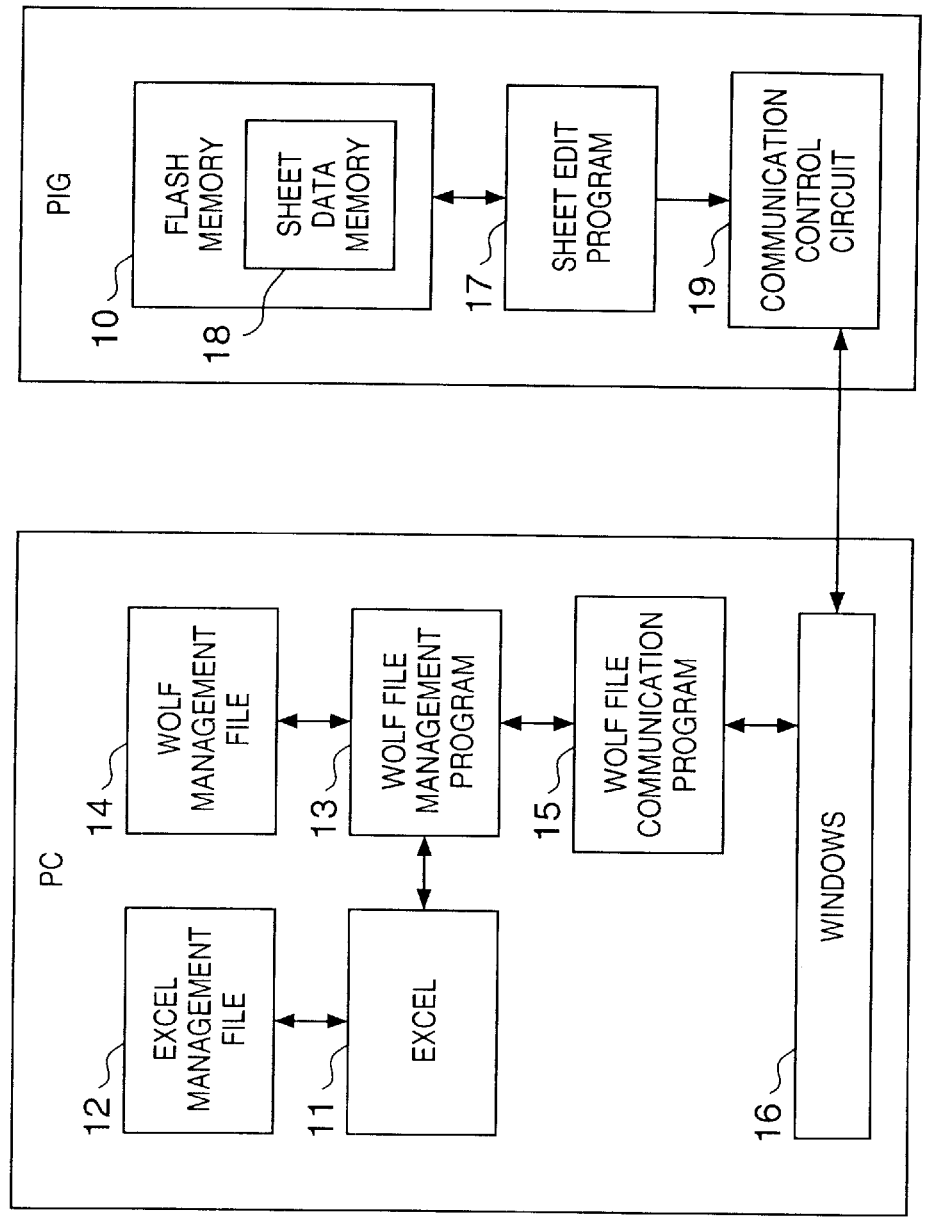
FIG. 3 is a diagram showing the arrangement of a file processing system in the second embodiment.

Referring to FIG. 3, a sheet edit program 17 in the PIG processes and edits an EXCEL management file sent from the PC. A sheet data memory 18 stores this file, and its memory area is assured in the flash memory 10. A communication control circuit 19 is a serial communication interface in the data transmitter/receiver 4 in FIG. 2.

Data stored in the sheet data memory 18 is edited by the sheet edit program 17, i.e., undergoes modification, addition, deletion, or the like of data. On the other hand, data received under the control of the data communication control circuit 19 (to be described later) is stored in the sheet data memory 18, and the data stored in the sheet data memory 18 is sent to the PC.

<File Management> . . . First Embodiment

FIG. 4 shows an example of the structure of the WOLF management file 14.

In the system of the first embodiment, the EXCEL and WOLF systems are present in the PC, and the PIG is present outside the PC. The EXCEL program 11 handles an EXCEL sheet file (a file with an extension "xls"), and the sheet edit program 17 of the PIG and the WOLF file management program 13 handle EXCEL sheet data (CSV data). Hence, there are three data files per EXCEL file. The WOLF system assures three data areas, i.e., EXCEL, WOLF, and PIG areas in the WOLF management file 14, as shown in FIG. 4. Each area is divided into an area for "update directory" and an area for "sheet data". Note that the update directory is a file having a format shown in FIG. 5 per record, and is set in units of EXCEL files to store the latest data of that EXCEL file. On the other hand, "sheet data" is CSV data (a data file consisting of text data and delimiters, i.e., "," and CR (carriage return)) of EXCEL files (files with an extension "xls").

Each of the "update directory" and "sheet data" areas consists of records set in units of EXCEL files. In the example shown in FIG. 4, the PC user has created EXCEL files with file names "FILE-A" and "FILE-B" on the PC. Hence, in the example shown in FIG. 4, the WOLF system has EXCEL directory and sheet data, WOLF directory and sheet data, and PIG directory and sheet data for EXCEL file "FILE-A" in the management file 14.

FIG. 5 shows the structure of an "update directory" record.

A so-called "spreadsheet" document can be created by the EXCEL program, as described above. In this embodiment, the management program 13 of the WOLF system or the sheet edit program 17 of the PIG can create a new sheet file in the CSV format. Since the management program 13 and sheet edit program 17 have limited functions, they manage files not by file names but by numbers assured separately. Hence, in the WOLF system, spreadsheet files are managed by "file numbers", as shown in FIG. 5. The WINDOWS system links a file with a given file number to its file by referring to "file name" in a directory. For example, if the EXCEL program 11 has created two files "FILE-A.xls" and "FILE-B.xls", and file numbers corresponding to these two files are "xxxxxx1" and "xxxxxx2", a "file name" field of each update directory record stores "FILE-A.xls" and "FILE-B.xls", and its "file number" field stores "xxxxxx1" and "xxxxxx2" respectively corresponding to "FILE-A.xls" and "FILE-B.xls", in the example shown in FIG. 4.

File titles such as "FILE-A.xls", "FILE-B.xls", and the like correspond to "file numbers" such as "xxxxxx1", "xxxxxx2", and the like by the management program 13. That is, when a file is created by the EXCEL program first, and is moved to the PIG, that file is managed by the file number in the WOLF system and PIG.

The "update directory" record has a "file size" field for storing data indicating the size of the corresponding file, a "file creation date" field indicating the date of creation (or last modification) of the file, and a "serial number" field indicating the number of times of modification/change of that file, after the "file number" field.

Figure 6:
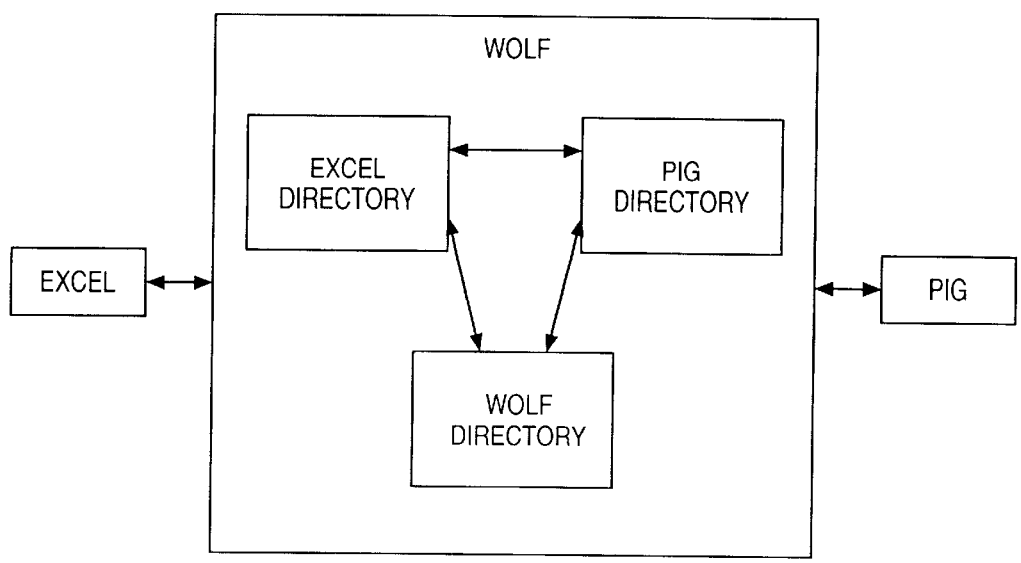
FIG. 6 is a diagram for explaining the principle of decision upon data update in the second embodiment.

As shown in FIG. 6, the WOLF file management program 13 manages files with the EXCEL system by referring to the contents of the "file name" and "file number" fields in the "EXCEL directory" record, and the "file name" and "file number" fields in the "WOLF directory" record. On the other hand, the WOLF file management program 13 manages files with the PIG by referring to the contents of the "file name" and "file number" fields in the "PIG directory" record, and the "file name" and "file number" fields in the "WOLF directory" record.

<Detection Principle of Change/Modification> . . . First Embodiment

The system of this embodiment detects data modification in a sheet file by:

I: detecting the differences between the dates of creation and serial numbers of two files; and/or
II: detecting a change in data by comparing actual file data in two files. Method II will be described later, and method I will be described below.

As is well known, when a file is created, the WINDOWS system writes the date and time of creation of the file in a WINDOWS system directory of that file. The WOLF of this embodiment associates the created file between the WINDOWS system and WOLF system. That is, the date and time of creation in the WINDOWS system directory are stored in the "file creation date" field (FIG. 5) in the EXCEL directory in the WOLF management file 14, and the value of its "serial number" field is initialized to "1".

After the file is associated, if data of that file is modified in the PIG, the value of the "serial number" field in the PIG directory for that file is incremented by "1" when the modified file is downloaded to the PC.

On the other hand, after the file is associated, if data of that sheet file is modified by the WOLF, the value of the "serial number" field in the WOLF directory of that file is incremented by "1" at that time.

Furthermore, after the file is associated, if data of that file is modified by the EXCEL, the value of the "serial number" field in the EXCEL directory of that file is incremented by "1" when the modified file is imported to the WOLF.

In this manner, it can be determined by checking non-coincidence of the values of the "serial number" fields if data has been modified by one of the PIG, WOLF, and EXCEL. Also, the latest one of the modified files can be determined based on the values of the "serial number" fields.

Note that the count value of each "serial number" field is set to fall within the range from 000 to 255 ($00_h$ to $FF_h$ in hexadecimal notation). That is, within a given date, the relationships among data modifications up to 255 times can be checked. This count value range is determined based on the fact that modifications of more than 255 times will not be done in a daily job ("one modification" is counted when a given file is opened and is closed after modification, independently of the number of modified positions in that file).

In consideration of the user who may modify a file more than 255 times, the WOLF system of this embodiment has an option for allowing the user to set the number of digits of each serial number field. In this option, when the user inputs his or her desired number of times, that number of times is converted into hexadecimal data, and an area corresponding to the number of digits of that hexadecimal data can be assured.

<Outline of Data Synchronous Update>

Data synchronous update between two data processing apparatuses (PIG and PC) is done on the condition that sheet files with the same title are present in these two apparatuses.

FIG. 7 shows examples in which files respectively created by the PIG, EXCEL, and WOLF are the latest ones. In either case, since a file with the maximum serial number contains the latest data, data of other files are synchronously updated to the file having the maximum serial number.

<Creation of New File> . . . First Embodiment

When the PC (or PIG) creates a new sheet file, no file of that title is not present in the other PIG (or PC). In other words, when one apparatus creates a new file, that sheet file must be copied to the other apparatus.

Figure 1:
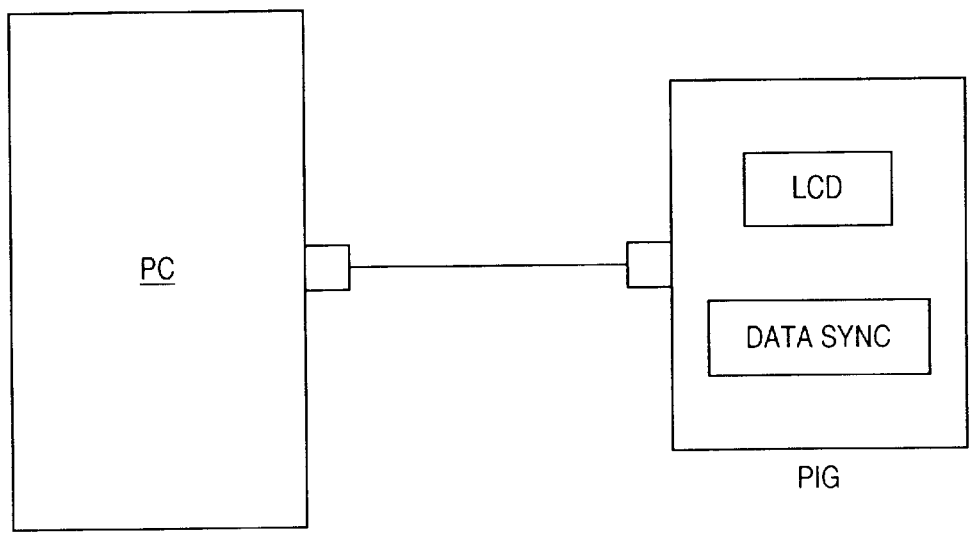
FIG. 1 is a diagram showing the overall arrangement of the second embodiment according to the present invention.
Figure 8:
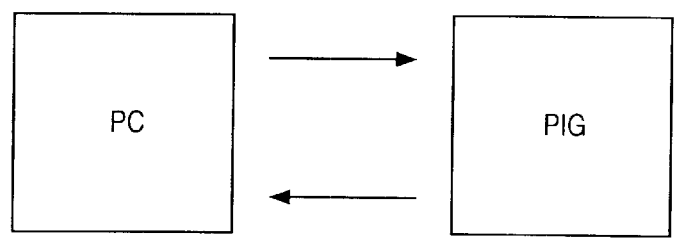
FIG. 8 is a view showing an example of buttons for starting data update.

In the system shown in FIG. 1, a sheet file is copied by starting the WOLF management program 13 of the PC and the sheet edit program 17 of the PIG at the same time. The user designates a copy direction, i.e., designates a newly created file by clicking one arrow on a dialog displayed on the display of the PC, as shown in FIG. 8. When a new file is created, since files having different titles are present in the two apparatuses, both the WOLF system and PIG cannot determine a newly created file unless the user specifies.

Figure 9:
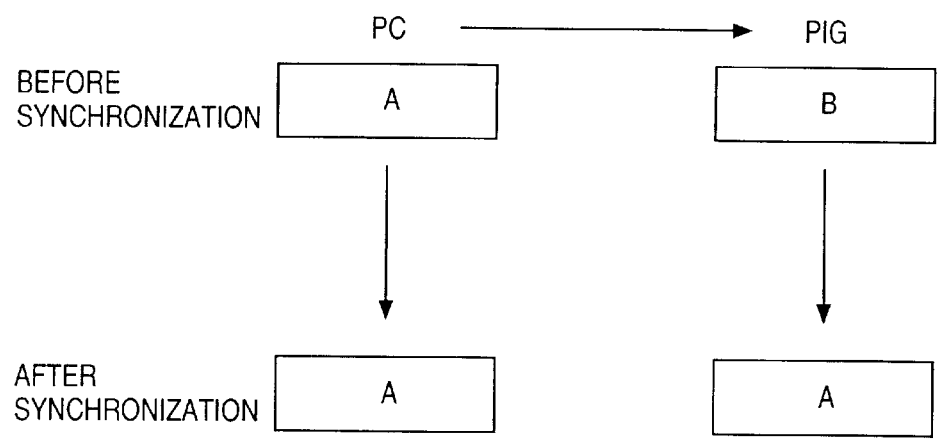
FIG. 9 is a view for explaining an example of data update.

In the example shown in FIG. 9, since the user designates a copy direction PC→PIG, file A newly created on the PC is overwritten on file B previously created on the PIG.

Since the PIG used in this embodiment is a portable terminal, the number of sheet files that the PIG can process is limited to one. Also, the display screen of the PIG is too small to create a new sheet file. For this reason, a combination of the WOLF system and PIG of this embodiment is set so that a new sheet file can be created by only the EXCEL on the PC. Hence, data synchronous update can be started by pressing a DATA SYNC button. Upon pressing the DATA SYNC button, when a sheet file having the same title as that of only one sheet file present in the PIG is not present in the PC, data synchronous update is not started, and a file on the PC is forcibly copied.

Of course, when a user interface shown in FIG. 8 is equipped, a new sheet file can be created on the PIG, and can be copied to the PC.

Figure 10:
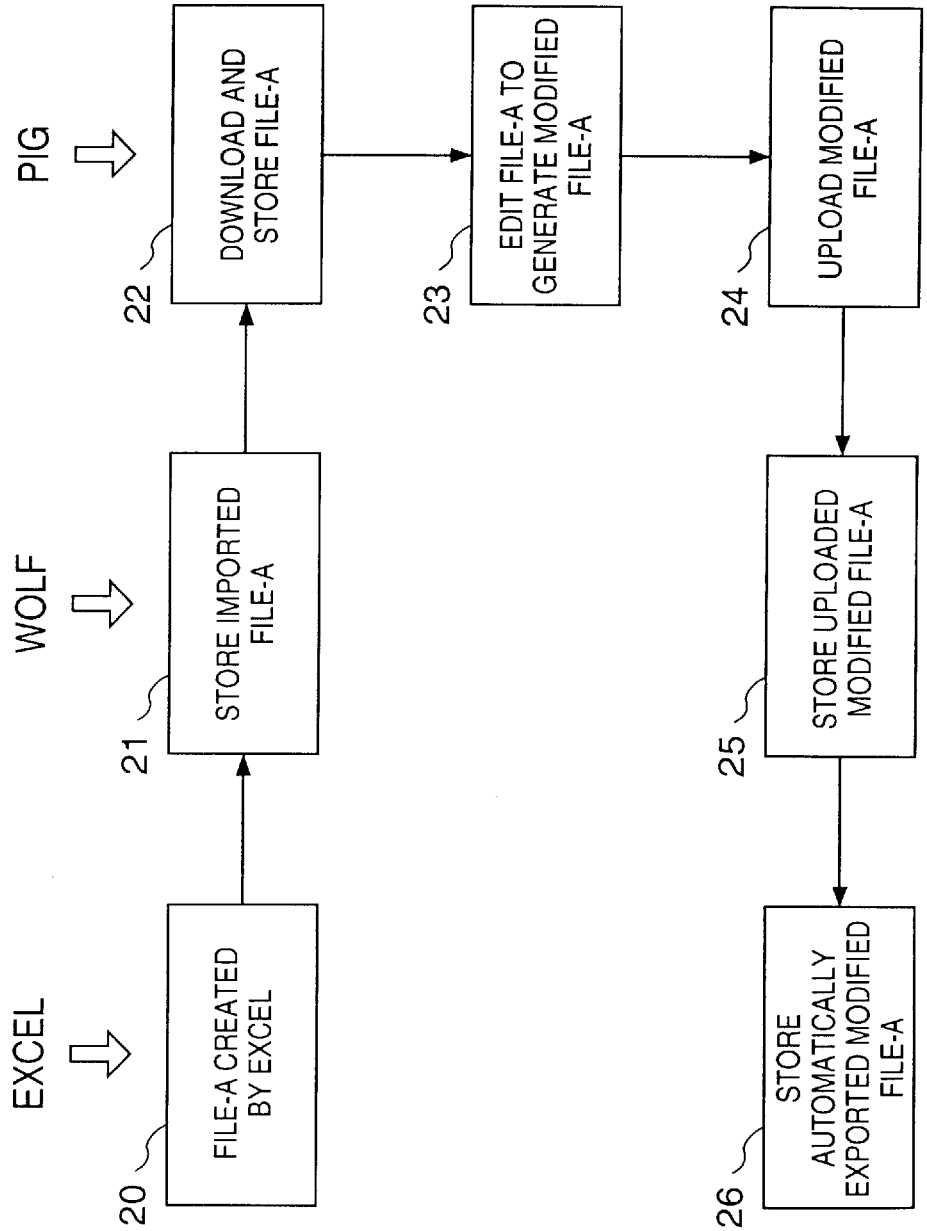
FIG. 10 is a flow chart showing one operation sequence in the second embodiment.

FIG. 10 is a flow chart for explaining the representative operation sequence that the user whose uses the PC and PIG will do using them in the system shown in FIG. 3. The example shown in FIG. 10 explains, in the vertical flow, a series of operations in which the user sends an EXCEL file (data exchange file) from the PC to the PIG ([send data from PC]), modifies data in the received data exchange file by running the sheet edit program 17 at the PIG ([modify data at PIG]), and sends the modified data exchange file to the PC ([send data from PIG]).

In the following description, the title of a file to be data-exchanged, which is created by the EXCEL, will be referred to as "FILE-A".

The horizontal flow in FIG. 10 indicates the outline of processes done in the PC or PIG. This situation assumes that, for example, a salesperson downloads FILE-A as a sales list from the PC to the PIG, then visits a customer, and modifies the sales contents on the PIG.

In the following description, operations such as DOWNLOAD, UPLOAD, IMPORT, EXPORT, and the like are expressions when viewed from the WOLF system. On the other hand, DOWNLOAD and UPLOAD indicate data transfers between the WOLF system on the PC and PIG via a transfer cable, when viewed from the WOLF system. Furthermore, IMPORT and EXPORT indicate data transfers in the PC, i.e., between the EXCEL system and WOLF system to have the WOLF system as a start point.

STEP 20:
FILE-A is created by running the EXCEL 11.
STEP 21:
FILE-A is imported from the EXCEL system to the WOLF management file 14. Data actually stored in a memory field of the management file 14 is called an "exchange data file", and data of this exchange data file consists of only codes that the PIG can process. The EXCEL and WOLF associate FILE-A on the EXCEL side and exchange data file on the WOLF side.

STEP 22:

While the PC and PIG are connected via a cable, the PIG sends a data transmission request to the PC to download data (exchange data) of FILE-A to the PIG. Also, the WOLF and PIG associate FILE-A.

STEP 23:

The PIG edits FILE-A and creates modified FILE-A that reflects the modified contents.

STEP 24:

While the PC and PIG are connected via the cable, the PIG sends a data reception request to the PC to upload the data of modified FILE-A from the PIG to the PC.

STEP 25:

Based on association of FILE-A done in step 22, the data of modified FILE-A sent from the PIG is stored in FILE-A in the memory field managed by the WOLF.

STEP 26:

Based on association of FILE-A done in step 21, the data of modified FILE-A stored in the WOLF is exported from the WOLF, and is stored in FILE-A in a memory field managed by the EXCEL.

The characteristic feature of this process is that not only a file managed by the WOLF but also a file managed by the EXCEL is automatically updated based on association between the EXCEL and WOLF when the portable terminal PIG located outside the personal computer PC issues a data communication command.

<Outline of Data Update Operation> . . . First Embodiment

Figure 11:
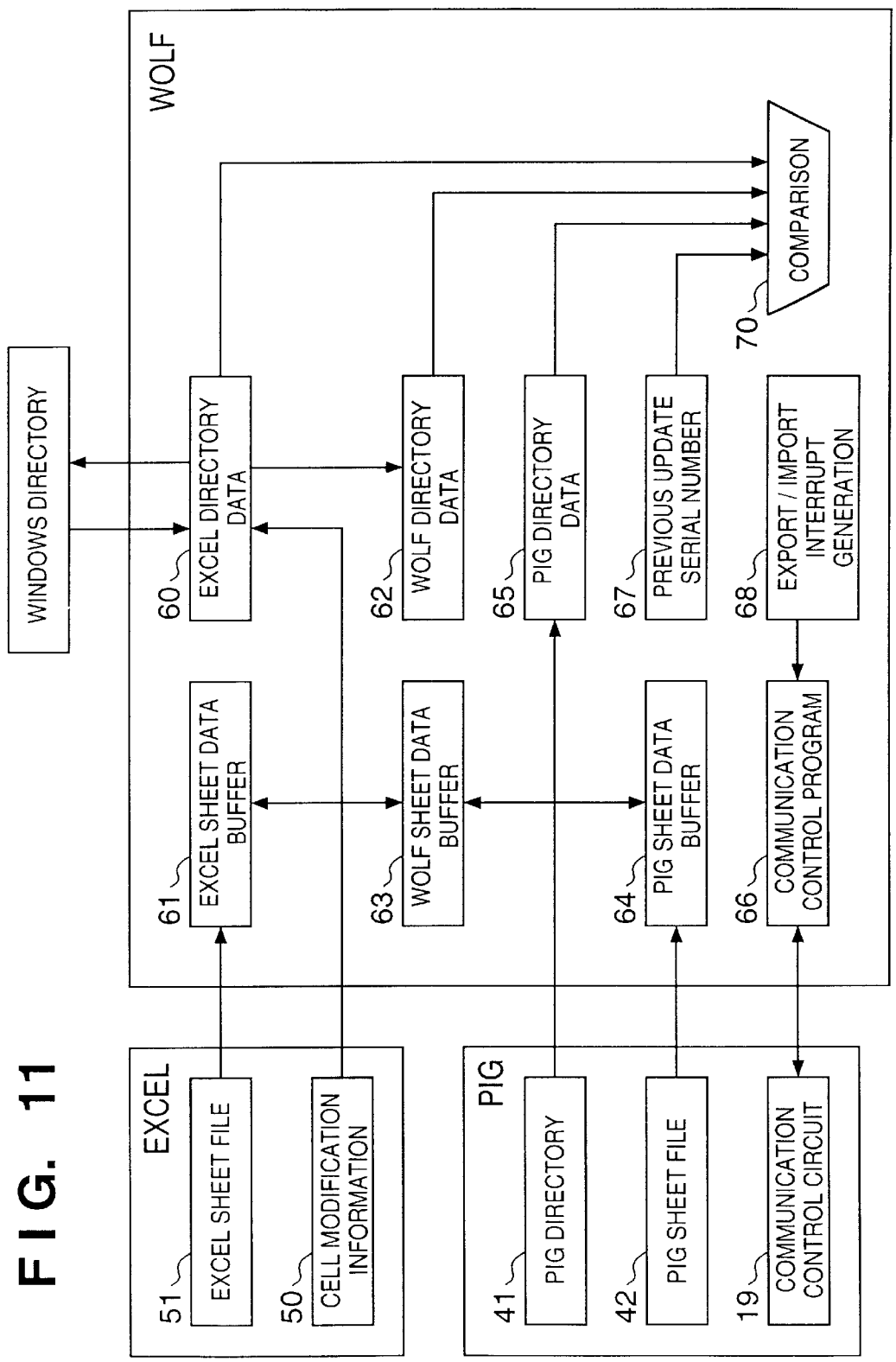
FIG. 11 is a functional block diagram of the first embodiment.

FIG. 11 is a block diagram showing the method of detecting modifications of files edited by the EXCEL, the WOLF file management program 13, and the PIG sheet edit program 17 using the directories shown in FIG. 6.

Referring to FIG. 11, when the program 17 of the PIG issues a data communication command to the WOLF data communication control program, the WOLF and PIG exchange a permission response of a communication. After that, the WOLF imports modification information (modification date information and modification time information in the WINDOWS directory in practice) of a file in the EXCEL under the control of an export/import interrupt generation program 68, and updates the contents of the EXCEL directory in the WOLF management file 14 based on the contents of the imported information.

Then, the contents of the PIG directory (having substantially the same structure as that shown in FIG. 5) in the PIG are uploaded into the WOLF to update the contents of the PIG directory.

Every time the WOLF file management program 13 edits a sheet file stored in the sheet data area, the contents of the WOLF directory (FIG. 4) are updated.

A directory comparison program 70 (FIG. 11) detects if the serial number is counted up, as described above, and determines the presence/absence of a data modification based on the detection result, i.e., change history.

A modified portion is detected as follows.

The WOLF file management program 13 imports data of an EXCEL sheet file (xls format) into the WOLF to recognize the modified contents. Importing at that time is implemented by reading out a text portion in EXCEL data having the xls format in the CSV format, i.e., by removing attributes of calculation formulas, graph data, and the like, and storing the readout data in an EXCEL sheet data area (buffer) 61 (the same applies to FIG. 4). In this manner, one file data to be compared is obtained. Next, the PIG uploads data (also having the CSV format) of a sheet file 41 of the PIG to a PIG sheet data area 64 of the WOLF.

After the aforementioned processes, data in the EXCEL sheet data area 61, WOLF sheet data area (buffer) 63, and PIG sheet data area (buffer) 64 are compared with each other in units of cells to detect modified portions, and data of modified cells ("modified data") are merged to generate a common file, which is reflected in the "EXCEL sheet data" area, "WOLF sheet data" area, and "PIG sheet data" area.

The data in the EXCEL sheet data area 61, which reflects the modified data, is exported to an EXCEL file 51 in the WINDOWS system, and data in the PIG sheet data area 64, which reflects the modified data, is downloaded to the file area 41 of the PIG.

<Processing Sequence> . . . First Embodiment

The details of the processing sequences with the aforementioned arrangement will be explained below with reference to the flow charts shown in FIGS. 12 to 20. Note that the names of files to be managed as the precondition of these processing flow charts are:

file managed by EXCEL: "FILE-A.xls"

file managed by WOLF: "FILE-A.wlf"

file managed by PIG: "FILE-A.pig"

Also, FILE-A.xls and FILE-A.wlf have already been associated.

The control sequences shown in FIGS. 12 to 20 are premised on that, for example, the PIG stores only one sheet file, as described above. Hence, a sheet file can be edited or modified by any of the EXCEL, WOLF, and PIG, but a new sheet file is created by the EXCEL (or by the WOLF in case of the CSV format).

FIGS. 12 to 20 show control made by the PIG (sheet edit program 17) and WOLF (file management program 13 and WOLF file communication program 15).

It is checked in step F1 if the user has pressed the DATA SYNC button of the PIG. The DATA SYNC button may be either a hardware button (FIG. 1) provided on the PIG or an icon displayed on the display screen 7 of the PIG by the sheet edit program 17.

If this button has been pressed, a data communication between the communication control circuit 19 of the PIG as a portable terminal and the file communication control program 15 in the PC is started.

In step F2, the PIG sends a data communication command to the PC via the cable.

The WOLF file management program 13 starts the WOLF file communication control program 15 that receives this command via WINDOWS. The communication control program 15 sends a permission response of a communication to the PIG via the cable in step F3.

It is checked in steps S4 to F6 if the title of the sheet file present in the PIG coincides with that of a sheet file present on the PC (WOLF) side, i.e., if the user has requested by pressing the DATA SYNC button to start data synchronous update or forcibly copy a PC file to the PIG.

That is, in step F4, the PIG uploads PIG directory data to the WOLF, in other words, the WOLF downloads PIG directory data to be used as data for above checking. The sheet edit program 17 of the PIG of this embodiment can edit one sheet file at one time due to the limited display screen space of the PIG. For this reason, the file of the directory data to be uploaded is a file which is currently opened by the edit program 17. More specifically, the directory data sent from the PIG contains a "file number":

xxxxxx1 corresponding to "FILE-A.pig". This data "xxxxxx1" is stored in a predetermined work area managed by the WOLF.

In step F5, the WOLF file management program 13 searches the WOLF directory area of the WOLF management file 14 for a sheet file having the same value as the "file number" (=xxxxxx1) described in the received directory data. If such file is present in the WOLF, that file may have a title:

FILE-A.wlf and a file number:

xxxxxx1

Figure 12:
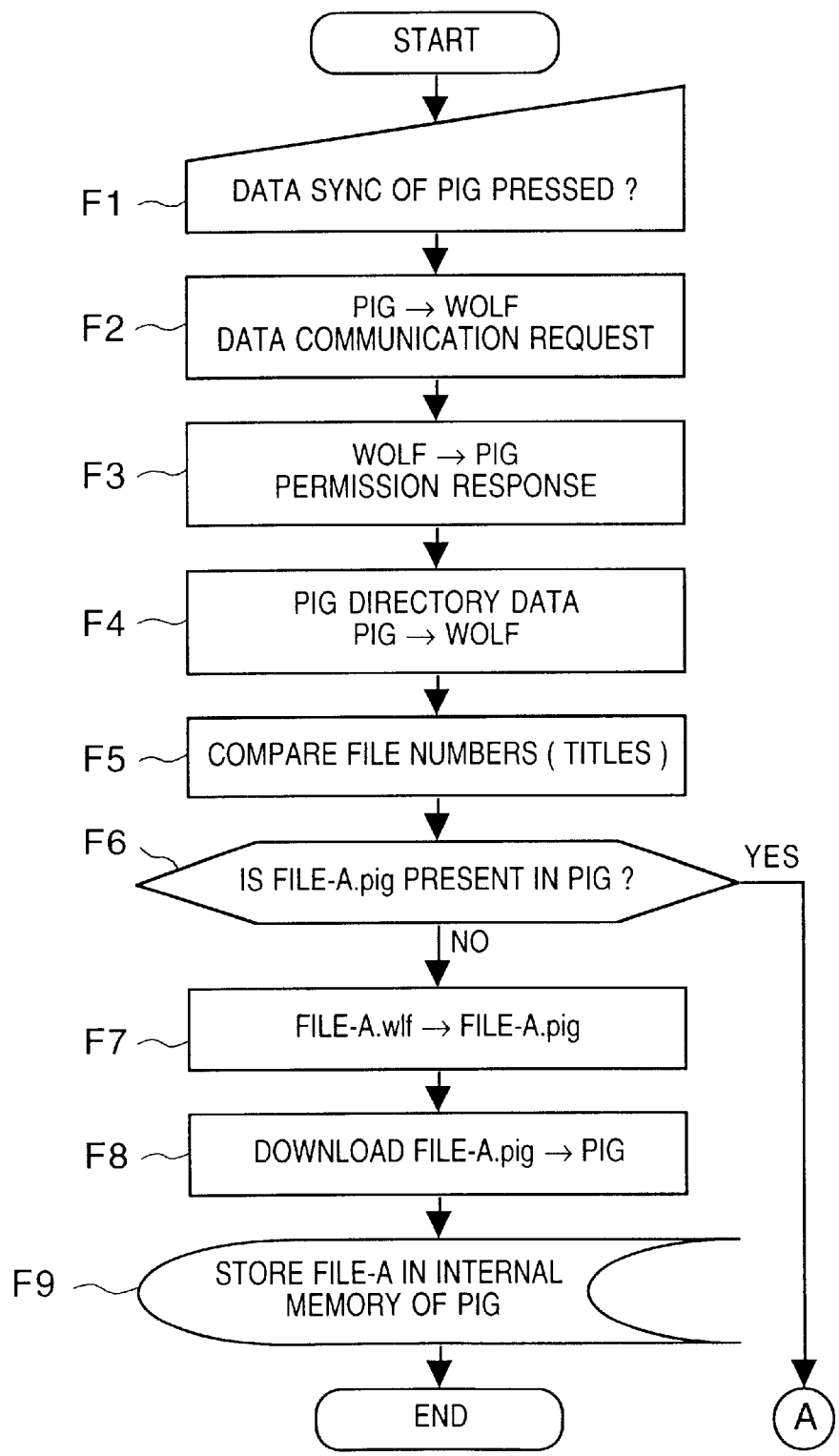
FIG. 12 is a flow chart showing the control sequence of the first embodiment.

In step F6, in accordance with the checking result in step F5, i.e., if a sheet file (having title "FILE-A.pig or file number "xxxxxx1") is present in the WOLF, the flow advances to step F11 (FIG. 13); otherwise, the flow advances to step F7 (FIG. 12).

Steps F7 to F10 are processes executed when FILE-A.pig is not present in the WOLF, i.e., processes for forcibly copying a newly created sheet file (title =FILE-A.wlf) to the PIG. That is, steps F7 to F10 are processes for generating a copy of FILE-A.wlf in the PIG.

More specifically, in step F7, file data FILE-A.wlf stored in the WOLF sheet data area 63, and directory data of FILE-A.wlf stored in the directory data area 62 are copied as FILE-A.pig in the PIG sheet data area 64 and directory data area 65.

The data of FILE-A.pig and directory data are downloaded to the PIG in step F8, and FILE-A.pig is stored in a memory in the PIG, thus ending the processing.

If it is determined in step F6 that the sheet file stored in the WOLF is stored in the PIG, i.e., the user has requested of data synchronous update between the PIG and PC, data are updated in the following control sequences shown in FIGS. 13 to 20. This embodiment is premised on that data is modified by least one of the EXCEL, WOLF, and PIG, as shown in a table below:

TABLE

Figure 14:
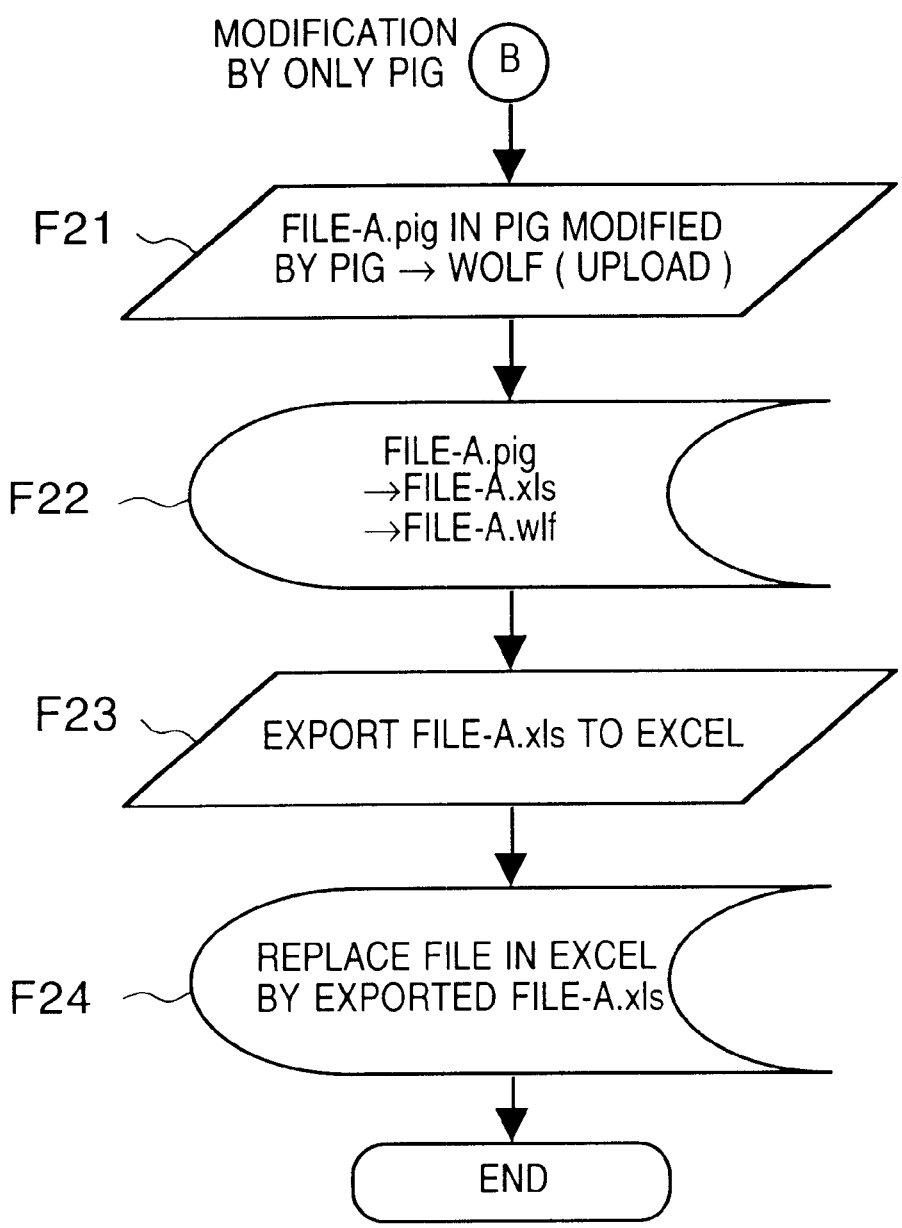
FIG. 14 is a flow chart showing the control sequence of the first embodiment.
Figure 15:
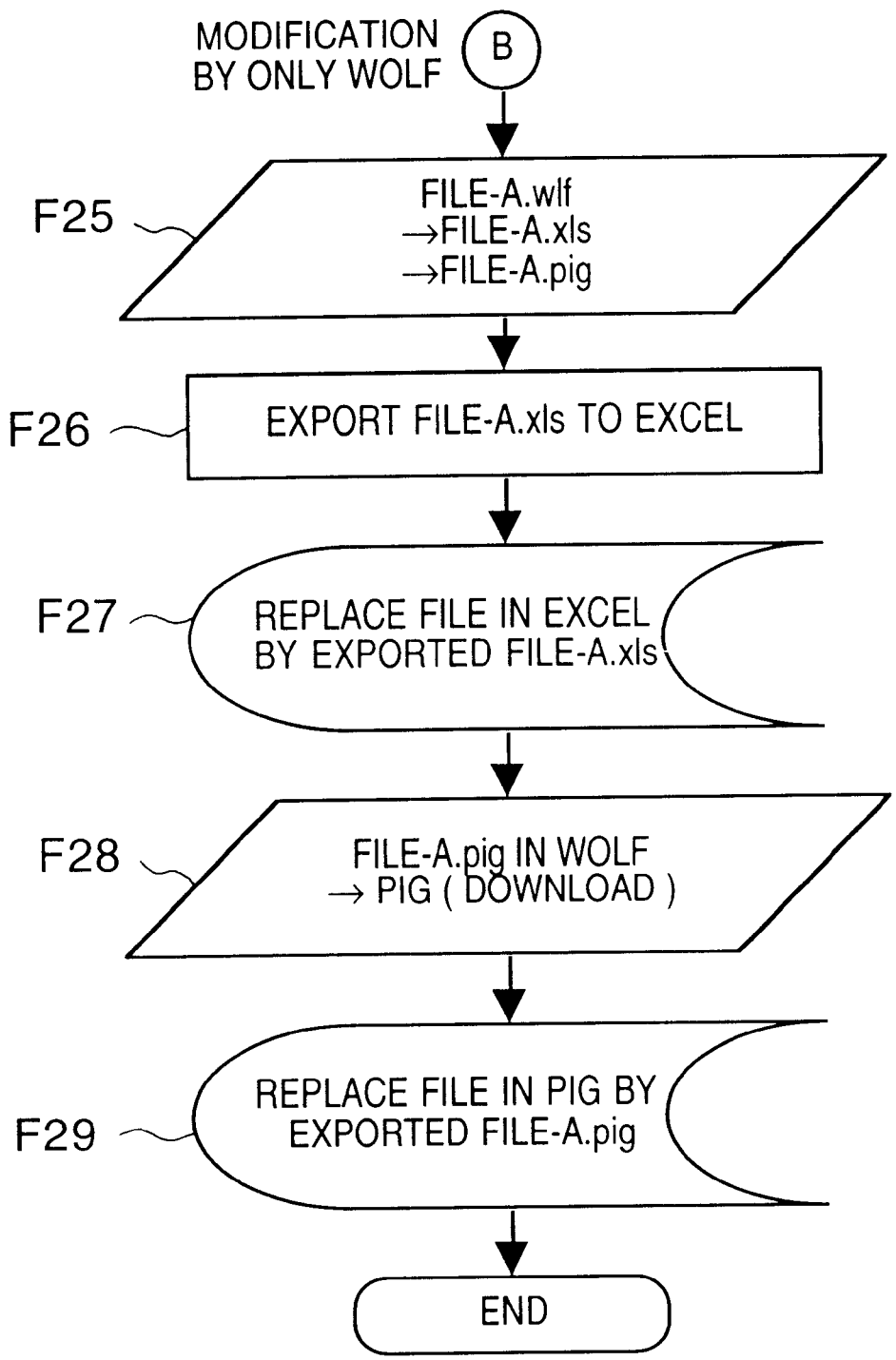
FIG. 15 is a flow chart showing the control sequence of the first embodiment.
Figure 16:
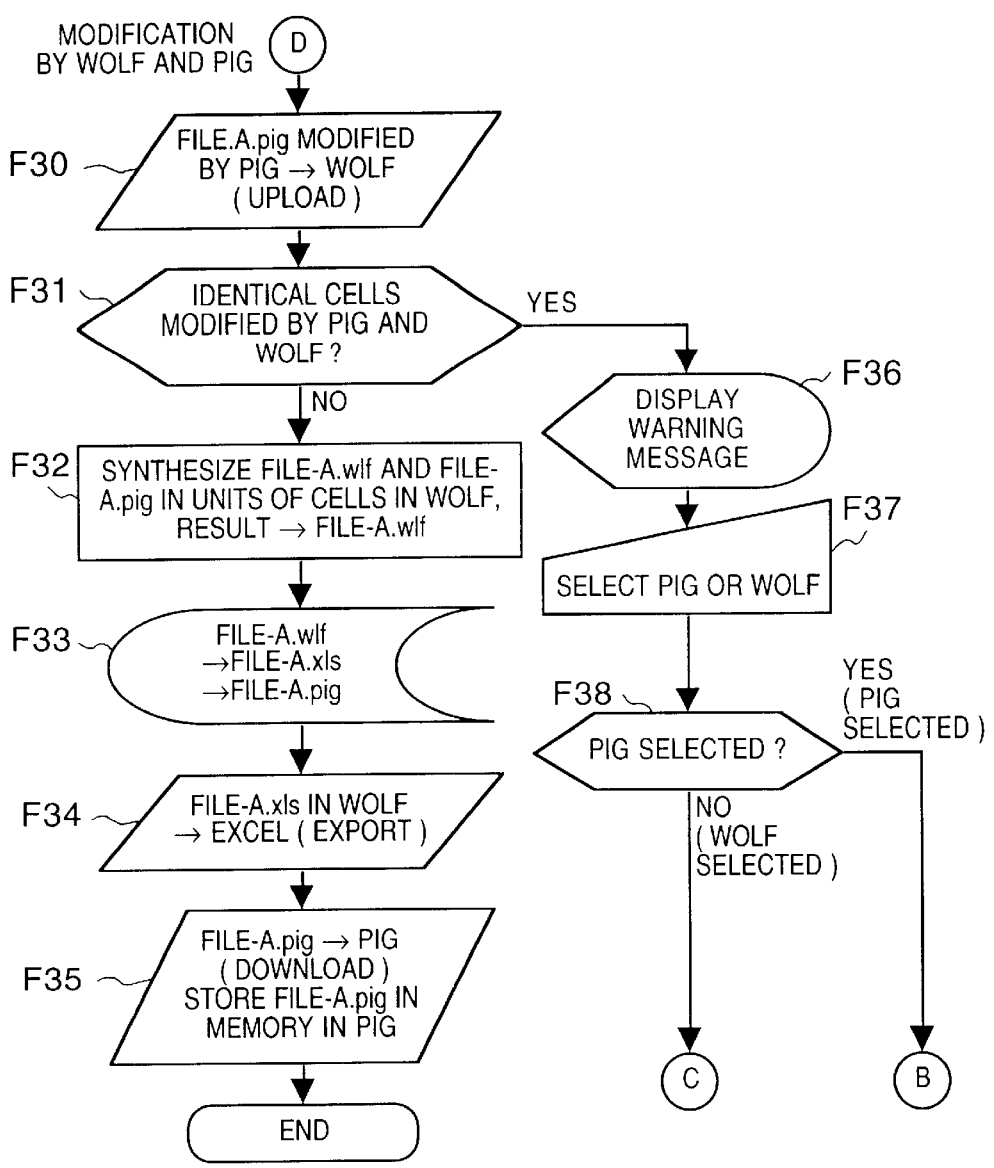
FIG. 16 is a flow chart showing the control sequence of the first embodiment.
Figure 17:
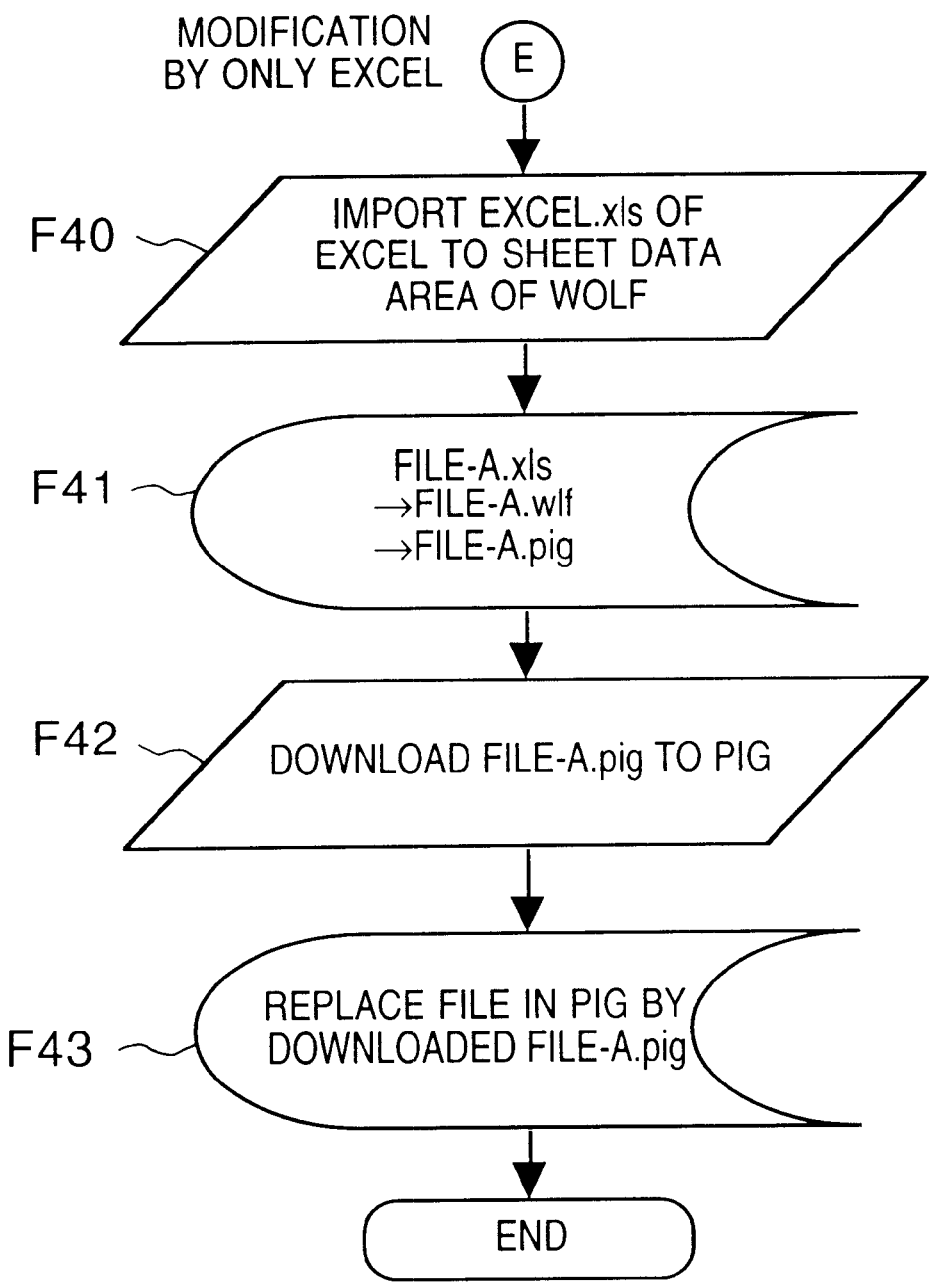
FIG. 17 is a flow chart showing the control sequence of the first embodiment.
Figure 18:
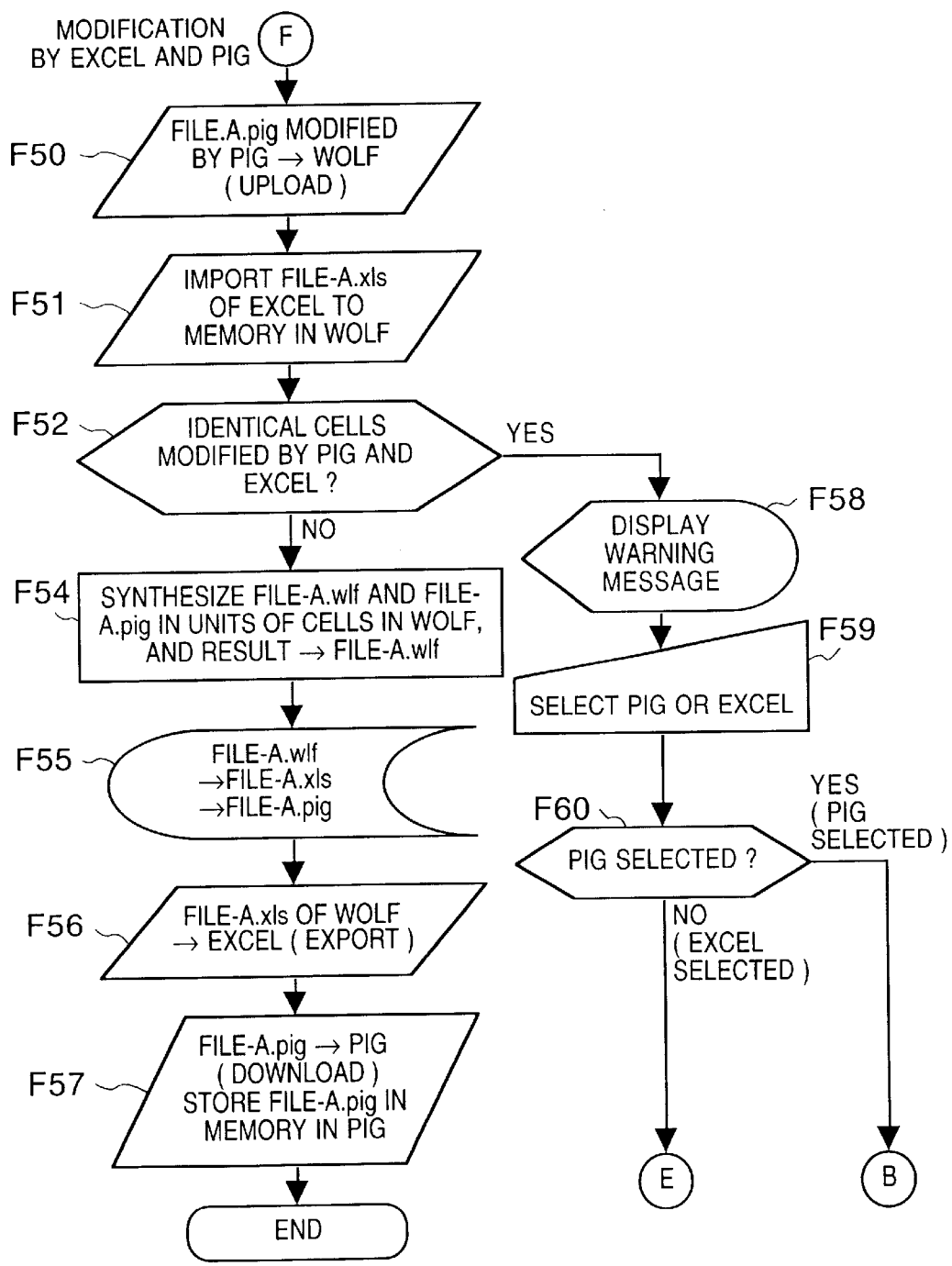
FIG. 18 is a flow chart showing the control sequence of the first embodiment.
Figure 19:
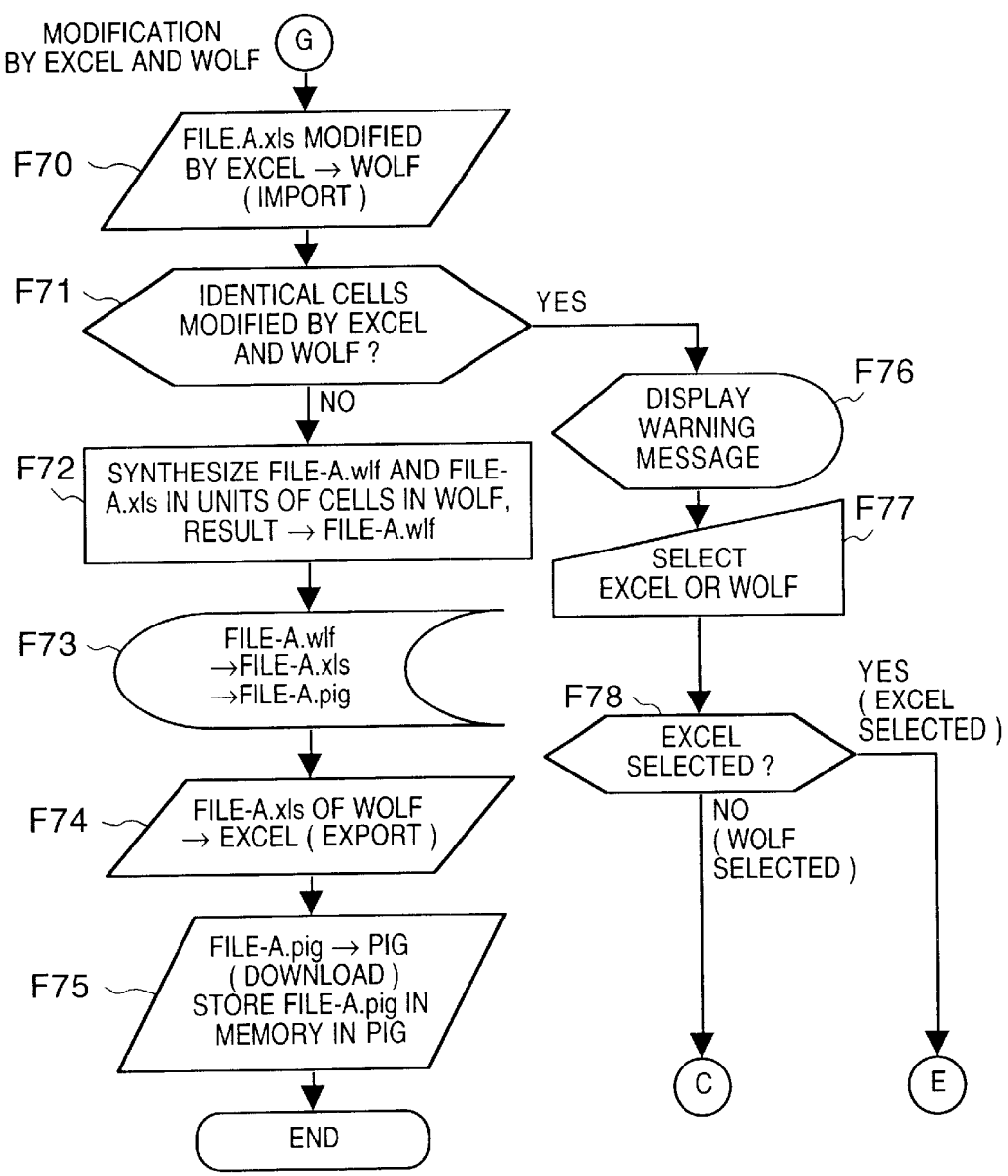
FIG. 19 is a flow chart showing the control sequence of the first embodiment.
Figure 20:
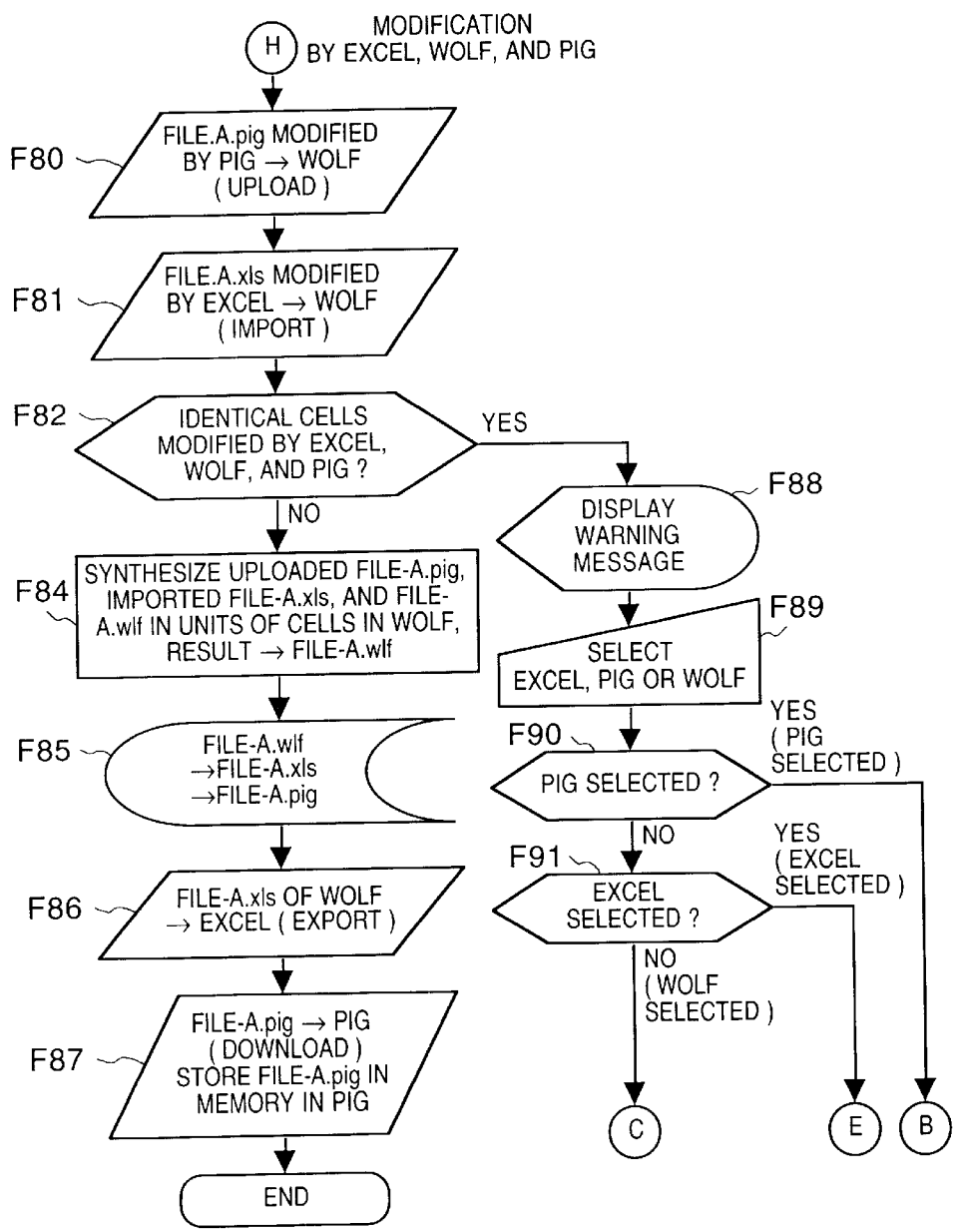
FIG. 20 is a flow chart showing the control sequence of the first embodiment.

| EXCEL | WOLF | PIG | BRANCH DESTINATION |
|---|---|---|---|
| modified | modified | modified | FIG. 20 |
| modified | modified | not modified | FIG. 19 |
| modified | not modified | modified | FIG. 18 |
| modified | not modified | not modified | FIG. 17 |
| not modified | modified | modified | FIG. 16 |
| not modified | modified | not modified | FIG. 15 |
| not modified | not modified | modified | FIG. 14 |

In step F10, edit/modification information (50 in FIG. 11) of the EXCEL sheet file (FILE-A.xls) managed by the EXCEL is imported to the WOLF. Note that the edit/modification information is created by the EXCEL program, and stores the addresses of edited cells when the user edits and modifies cells of a sheet using the EXCEL program. In step F11, directory data of FILE-A.xls, which is managed by WINDOWS, is created in an area 60 in the WOLF management file 14.

In step F11, serial numbers in directory data acquired from the EXCEL, WOLF, and PIG are checked to detect if data have been modified in the respective files. Whether or not data have been modified is determined by comparing serial numbers in directory data (60, 62, and 65) of FILE-A.xls, FILE-A.wlf, and FILE-A.pig with the value of serial number SN synchronized upon previous update in the WOLF management file. If the serial numbers stored as directory data in correspondence with FILE-A.xls, FILE-A.wlf, and FILE-A.pig are sn.xls, sn.wlf, and sn.pig, it is determined that files having serial number values larger than the value SN have been updated. For example, if:

sn.xls>SN
sn.wlf=SN
sn.pig>SN this means that the user has edited or modified in the PC using the EXCEL program, or has edited or modified on the PIG using the edit program 17.

Figure 13:
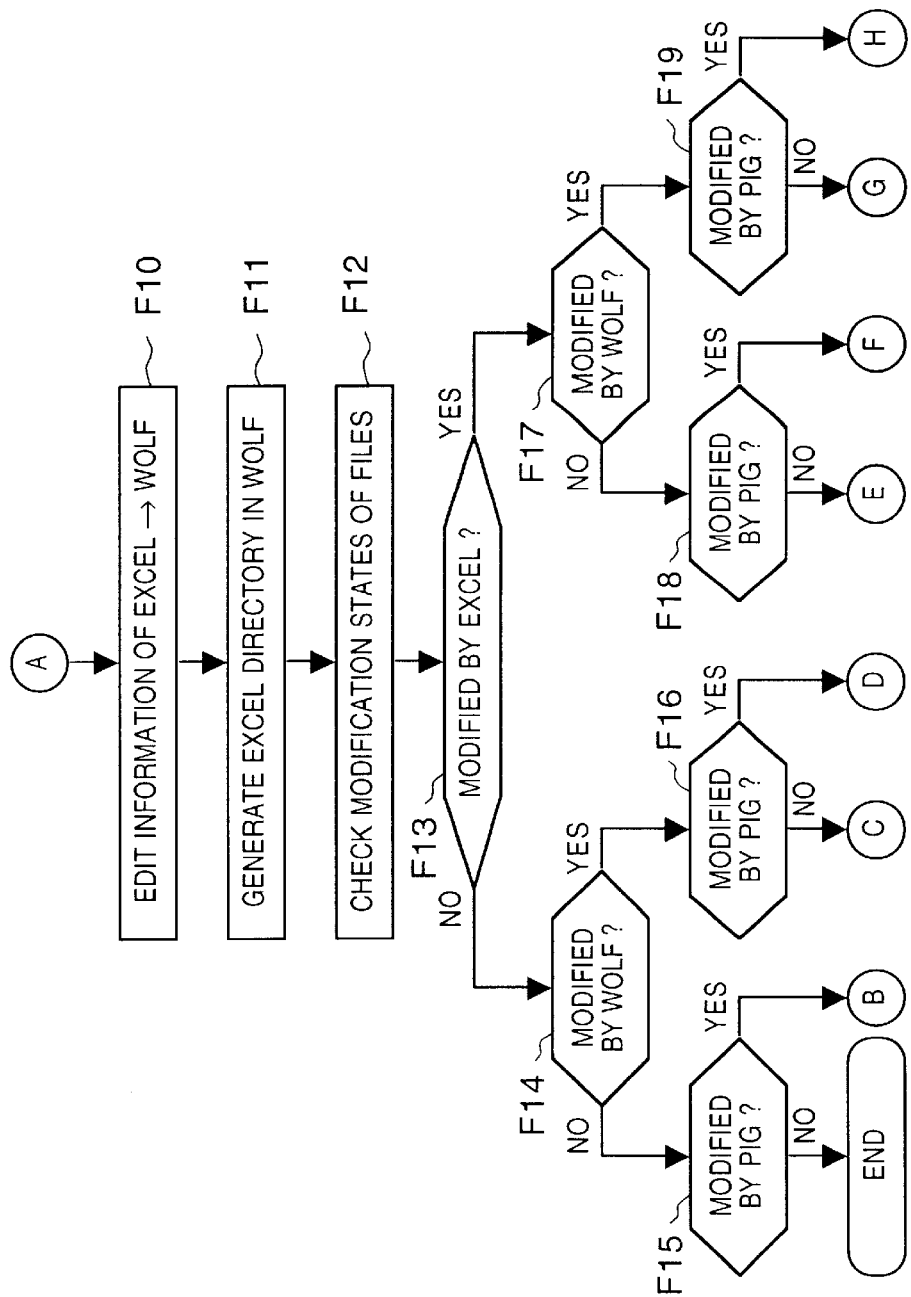
FIG. 13 is a flow chart showing the control sequence of the first embodiment.

In steps F13 to F19 in FIG. 13, the flow advances to the next step according to the modification states of the respective files.

<Modification Made by Only PIG>

FIG. 14 shows the processing flow when a data modification is made by only the PIG.

Sheet data FILE-A.pig in the PIG is uploaded to the WOLF in step F21, and the contents of sheet data FILE-A.pig are transferred to sheet data areas FILE-A.wlf (63) and FILE-A.xls (61) in step F22. In step F23, FILE-A.xls (61) is exported to the EXCEL. In step F24, data of FILE-A.xls in the EXCEL is changed and stored in correspondence with the exported data. Furthermore, a previous update serial number 67 is replaced by the serial number of the PIG.

With these processes, data of FILE-A.pig modified at the PIG is reflected in the EXCEL and WOLF.

<Modification Made by Only WOLF>

This case will be explained below with reference to FIG. 15.

In step F25, FILE-A.wlf modified by the WOLF is transferred into the EXCEL sheet data buffer 61 as FILE-A.xls, and into the PIG buffer 64 as FILE-A.pig. In step F26, FILE-A.xls is exported to the EXCEL. In step F27, the EXCEL file is changed and stored in correspondence with the exported data.

In step F28, FILE-A.pig in the WOLF is downloaded to the PIG. In step F29, the PIG stores the downloaded FILE-A.pig. Furthermore, the previous update serial number 67 is replaced by the serial number of WOLF.pig.

With the above processes, data of FILE-A.wlf modified by the WOLF is reflected in the EXCEL and PIG.

<Data Modifications Made by WOLF and PIG>

This case will be explained below with reference to FIG. 16.

In step F30, modified FILE-A.pig is uploaded, and is stored in the PIG buffer 64.

In step F31, the modification contents of FILE-A.wlf of the WOLF and uploaded FILE-A.pig are checked, and it is determined if identical cells have been modified. If only different cells have been modified, the flow advances to step F32; if identical cells have been modified, the flow advances to step F36.

When only different cells have been modified, this means that modifications have been made at only different cell addresses since the previous synchronous update. That is, the updated data in both the files are effective modified data. Hence, data are synthesized in units of cells to use both the modified data.

That is, in step F32, the modified contents of FILE-A.wlf and FILE-A.pig are synthesized in units of cells, and the synthesized contents are stored in FILE-A.wlf. In step F33, synthesized FILE-A.wlf is transferred to the FILE-A.xls buffer 61 and FILE-A.pig buffer 64. In step F34, transferred FILE-A.xls is exported to and stored in the EXCEL. In step F35, transferred FILE-A.pig is downloaded to and stored in the PIG.

With the above-mentioned processes, data of the files modified by the WOLF and PIG are synthesized in units of cells to create a common file on file FILE-A.wlf of the WOLF, and that common file is transferred to the EXCEL and PIG, thus completing commonization of file data.

A case will be explained below wherein cells having identical cell addresses have been modified by the WOLF and PIG.

If it is determined in step F31 that data in identical cells have been modified, a warning message is generated in step F36. If a modification is made at one cell address, the latest effective modified data can be determined on the basis of the serial numbers. However, data are unlikely to be modified at only one cell address. When modifications have been made at a plurality of cell addresses between the two files, the aforementioned determination cannot be made. Hence, in step F36, a message is displayed to inquire of the user as to the priority order of selection of the modifications by the WOLF and PIG.

If the user inputs the priority order of selection of the modifications at the keyboard of the PC in step F36, the input result of the priority order is checked in step F38.

If the user selects the modification by the PIG to be preferentially used, the flow advances to the control sequence shown in FIG. 14. When modifications have been made by the PIG and WOLF and the user selects the modification by the PIG, it is determined that the modification has been made at only the PIG, and that modification is reflected in the EXCEL and WOLF. Therefore, the processes shown in FIG. 14 are executed. That is, the data modification at the PIG is reflected in the EXCEL and WOLF files.

On the other hand, if the user selects the modification by the WOLF to be preferentially used in step F37, the flow advances to the control sequence in FIG. 15, and the data modification by the WOLF is reflected in the EXCEL and PIG files. Furthermore, the previous update serial number 67 is replaced by a larger one of the serial numbers of WOLF-.wlf and PIG.pig.

With the above-mentioned processes, when identical cells have been modified by the WOLF and PIG, the user is informed of the current situation by the message, and inputs the priority order of selection so as to reflect the modification by the WOLF or PIG in other files, thus completing commonization of file data.

<Modification Made by Only EXCEL>

In this case, the control sequence shown in FIG. 17 is executed.

In step F40 in FIG. 17, CSV data of FILE-A.xls modified by the EXCEL is imported to the EXCEL buffer 61 of the WOLF as FILE-A.xls. In step F41, imported FILE-A.xls is transferred to the WOLF FILE-A.wlf buffer 63 and PIG FILE-A.pig buffer 64.

In step F42, FILE-A.pig is downloaded to the PIG. In step F43, the PIG replaces and stores an old file by downloaded FILE-A.pig.

With the above processes, data of FILE-A.xls modified by the EXCEL is reflected in the WOLF and PIG.

<Modifications Made by EXCEL and PIG>

This case will be explained below with reference to FIG. 18.

In step F50, FILE-A.pig modified by the PIG is uploaded to the PIG buffer 64 of the WOLF. In step F51, CSV data of FILE-A.xls modified by the EXCEL is imported to the EXCEL buffer 61 in the WOLF.

In step F52, the modified contents of imported FILE-A.xls and uploaded FILE-A.pig are checked to detect if identical cells have been modified.

If only different cells have been modified, the flow advances to step F54; if identical cells have been modified, the flow advances to step F58.

If only different cells have been modified, in step F54 modified data are synthesized in units of cells on the basis of the modified contents of FILE-A.pig in the PIG buffer and FILE-A.xls in the EXCEL buffer, and the synthesized result is stored in FILE-A.wlf.

In step F55, FILE-A.wlf as a common file is transferred to FILE-A.xls in the EXCEL buffer and FILE-A.pig in the PIG buffer. In step F56, FILE-A.xls is exported to the EXCEL. In step F57, FILE-A.pig is downloaded to and stored in the PIG.

With the above-mentioned processes, data of files modified by the EXCEL and PIG are synthesized in units of cells to generate a common file on file FILE-A.wlf of the WOLF. The common file is transferred to the EXCEL and PIG, thus completing commonization of file data.

The processes in steps F58 to F60 are done when cells at identical addresses have been modified by the EXCEL and PIG. In step F58, a message is displayed to inquire of the user as to the priority order of selection of modifications by the EXCEL and PIG. In step F59, the user inputs the priority order of selection of the modifications by the EXCEL and PIG at the keyboard of the PC. Based on the priority order, whether the modification by the EXCEL or PIG is selected is determined in step F60. If the modification by the PIG is selected, the processes in the control sequence shown in FIG. 14 are executed to reflect the data modification by the PIG in the EXCEL and WOLF. On the other hand, if the modification by the EXCEL is selected, the processes shown in FIG. 17 are executed to reflect the data modification by the EXCEL in the files of the WOLF and PIG.

With the aforementioned processes, when identical cells have been modified by the EXCEL and PIG, the user is informed of the current situation by the message, and inputs the priority order of selection. Then, the modification by the EXCEL or PIG is reflected in other files, thus completing commonization of file data.

<Data Modifications Made by EXCEL and WOLF>

This case will be explained below with reference to FIG. 19.

In step F70, CSV data of a sheet file modified by the EXCEL is imported to the EXCEL buffer 61 in the WOLF as FILE-A.xls. In step F71, the modified contents of imported FILE-A.xls and FILE-A.wlf as the file of the WOLF are checked to detect if identical cells have been modified.

If only different cells have been modified, the flow advances to step F72; if identical cells have been modified, the flow advances to step F76.

In step F72, modified data are synthesized in units of cells on the basis of the modified contents of FILE-A.xls in the EXCEL buffer and FILE-A.wlf as the WOLF file, and the synthesized result is stored in FILE-A.wlf.

In step F73, FILE-A.wlf as a common file is transferred to FILE-A.xls in the EXCEL buffer and FILE-A.pig in the PIG buffer. Then, FILE-A.xls is imported to and stored in the EXCEL in step F74, and FILE-A.pig is downloaded to and stored in the PIG in step F75.

With the above processes, data of the files modified by the EXCEL and WOLF are synthesized in units of cells to generate a common file on WOLF file FILE-A.wlf. The common file is transferred to the EXCEL and PIG, thus completing commonization of file data.

Steps F76 to F78 are executed when data written at identical cells have been modified by the EXCEL and WOLF. In step F76, a message is displayed to inquire of the user as to the priority order of selection of modifications by the EXCEL and WOLF since identical cells have been modified. In step F77, the user inputs the priority order of selection of modifications by the EXCEL and WOLF at the keyboard of the PC. Based on the priority order, whether the modification by the EXCEL or PIG is selected is determined in step F78. If the user selects the modification by the EXCEL, the processes shown in FIG. 17 are executed to reflect the data modification by the EXCEL in the WOLF and PIG. On the other hand, if the user selects the modification by the WOLF, the processes shown in FIG. 15 are done to reflect the data modification by the WOLF in files of the EXCEL and PIG.

With the above processes, when identical cells have been modified by the EXCEL and WOLF, the user is informed of the current situation by the message, and inputs the priority order of selection. Then, the modification by the EXCEL or WOLF is reflected in other files, thus completing commonization of file data.

<Modifications Made by EXCEL, WOLF, and PIG>

This case will be explained below with reference to FIG. 20.

In step F80, FILE-A.pig modified by the PIG is uploaded to the PIG buffer of the WOLF. In step F81, data of FILE-A.xls modified by the EXCEL is imported to the EXCEL buffer of the WOLF.

In step F82, the modified contents among imported FILE-A.xls, FILE-A.wlf of the WOLF, and uploaded FILE-A.pig are checked to detect if identical cells have been modified.

If only different cells have been modified, the flow advances to step F84; if identical cells have been modified, the flow advances to step F88.

In step F84, modified data are synthesized in units of cells on the basis of the modified contents of FILE-A.xls in the EXCEL buffer, FILE-A.wlf as the WOLF file, and FILE-A.pig in the PIG buffer, and the synthesized result is stored in FILE-A.wlf.

In step F85, FILE-A.wlf as a common file is transferred to the EXCEL FILE-A.xls buffer 64 and PIG file-A.pig buffer. In step F86, FILE-A.xls is imported to the EXCEL. In step F87, FILE-A.pig is downloaded to and stored in the PIG.

With the above processes, data of the files modified by the EXCEL, WOLF, and PIG are synthesized in units of cells to generate a common file on WOLF file FILE-A.wlf. The common file is transferred to the EXCEL and PIG, thus completing commonization of file data.

If data at identical cell addresses have been modified by the EXCEL, WOLF, and PIG, a message is displayed to inquire of the user as to the priority order of selection of modifications by the EXCEL, WOLF, and PIG. In step F89, the user inputs the priority order of selection at the keyboard of the PC. Based on the input priority order, it is checked in steps F90 and F91 if the modification by the EXCEL, WOLF, or PIG is selected.

If the user selects the modification by the PIG, the processes shown in FIG. 14 are executed to reflect the data modification by the PIG in the EXCEL and WOLF.

If the user selects the modification by the EXCEL, the processes in FIG. 17 are executed to reflect the data modification by the EXCEL in the WOLF and PIG.

If the user selects the modification by the WOLF, the processes shown in FIG. 15 are executed to reflect the data modification by the WOLF in the EXCEL and PIG files.

With the above processes, when identical cells have been modified by the EXCEL, WOLF, and PIG, the user is informed of the current situation by the message, and inputs the priority order of selection. Then, the modification by the EXCEL, WOLF, or PIG is reflected in other files, thus completing commonization of file data.

<Effects of First Embodiment>

As described above, according to the first embodiment, the following effects are obtained.

I: By pressing the DATA SYNC button on the PIG as a terminal apparatus, the modified states can be shared among EXCEL and WOLF files in the PC, and a file in the terminal apparatus PG. A data modification in a given file can be reflected in other files by one-touch operation.

II: Since a common file is generated by storing a file managed by the EXCEL in the EXCEL buffer managed by the WOLF by removing attributes such as calculation formulas, graph data, and the like, the PIG can store minimum, required data such as character data, numerical data, and the like in a size much smaller than that of the file stored in the EXCEL.

III: Since the process for generating a common file based on the modified contents among files is done by the WOLF program in the PC, no processing software for generating a common file is required in the PIG, and the size of the memory that stores the PIG program can be reduced.

IV: Whether or not each file has been modified is managed using serial numbers in the corresponding directories. Hence, data modifications can be reliably checked by a simple method using a small management memory size.

V: Since a common file is generated by synthesizing modifications at different cells of the respective files, the modified contents can be reflected via a single data communication even when modifications have been made at both the PC and PIG.

VI: When identical cells have been modified in the respective files, a message is displayed to inform the user of that fact, and after that, the user selects one of the modified files. With this management, effective data can be prevented from being automatically discarded.

<Modification of First Embodiment>

In the first embodiment, modifications of cells must be stored in units of cells. In order to store modifications of cells, not only the PC but also the portable terminal (PIG) requires a memory. According to the present invention, even when records of changes in units of cells are not modified, data synchronous update can be implemented using only the serial numbers in the corresponding directories. However, in this case, data cannot be synthesized in units of cells among two or more files.

Also, synchronous update can be implemented even when neither modified data in units of cells nor the serial number upon previous update are stored. In this case, however, the latest changed file can be determined among EXCEL.xls, WOLF.wlf, and PIG.pig, but a plurality of changed files cannot be detected.

In the above embodiment, files are identified using numbers, but may be identified by titles as in a conventional system.

<Second Embodiment>

The first embodiment described above synchronously updates the text portion of an EXCEL file. The second embodiment updates data by executing a cell arithmetic operation function and the like, and also re-executing a cell attribute function. The EXCEL program not only has a function of creating a spreadsheet by filling characters/numerals on a table, but also uses functions required for a spreadsheet and various high-level attributes such as attribute information of characters including a font size/italic/bold, a calculation function among cells, a graph function, and the like. The second embodiment synchronously updates these functions.

Figure 21:
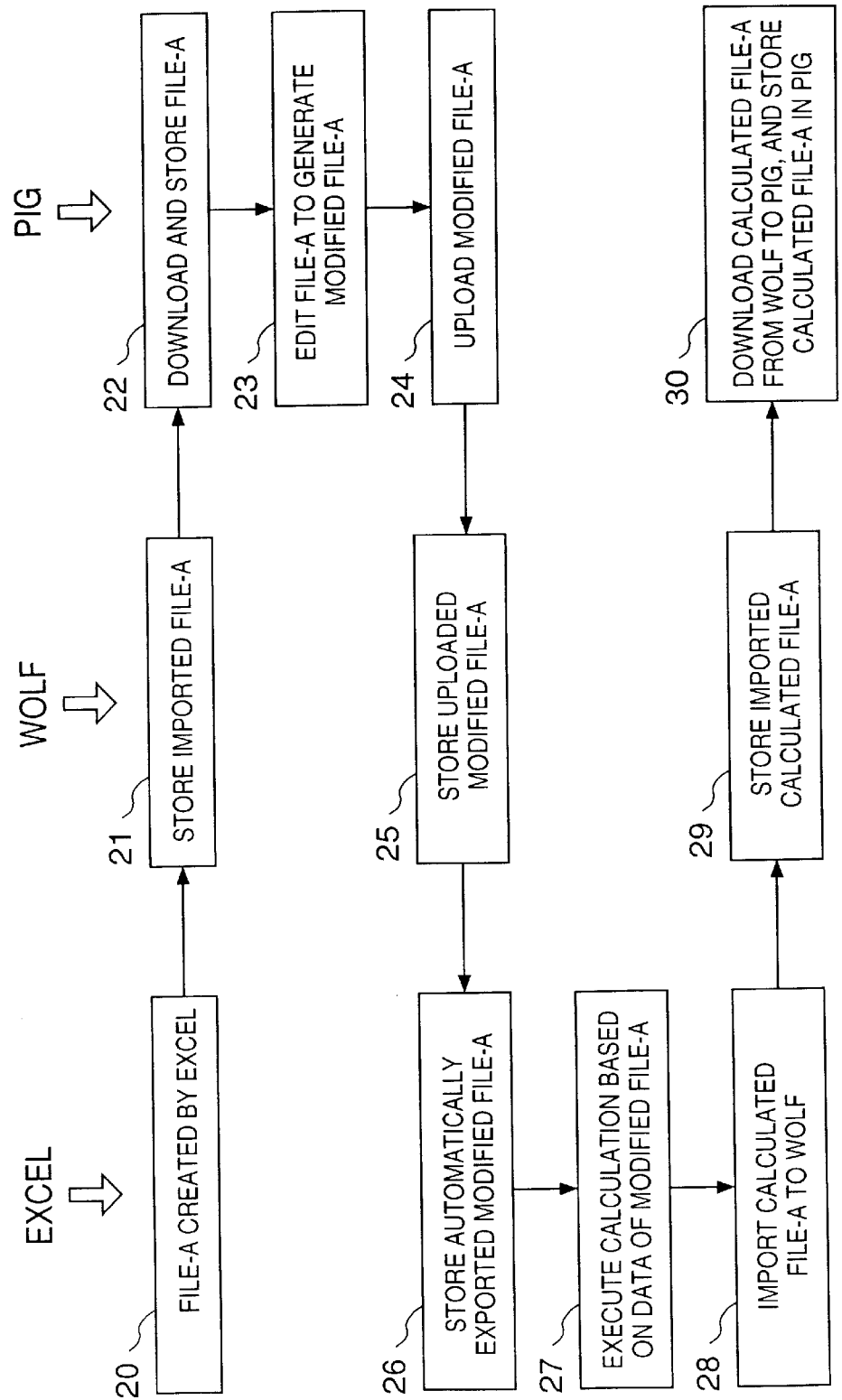
FIG. 21 is a flow chart showing the control sequence of the second embodiment.

FIG. 21 shows the outline of the second embodiment. FIG. 21 corresponds to FIG. 10 that explains the first embodiment. Steps added to FIG. 10 will be additionally explained below.

STEP 27:

FILE-A is recalculated based on the data modification of exported modified FILE-A.

STEP 28:

Recalculated FILE-A is imported from the EXCEL to the WOLF and is stored as FILE-A in the memory field of the WOLF on the basis of association of FILE-A done in step 21.

STEP 29:

The recalculated data of file-A is downloaded to the PIG and is stored as FILE-A in the memory field of the PIG on the basis of association of FILE-A done in step 22.

The characteristic feature of the second embodiment lies in that when the portable terminal PIG outside the PC issues a data communication command, not only files managed by the WOLF but also files managed by the EXCEL are automatically updated on the basis of association between the EXCEL as versatile software and the WOLF, and after a recalculation is made by the EXCEL, the updated file is returned to the WOLF and PIG.

Figure 22:
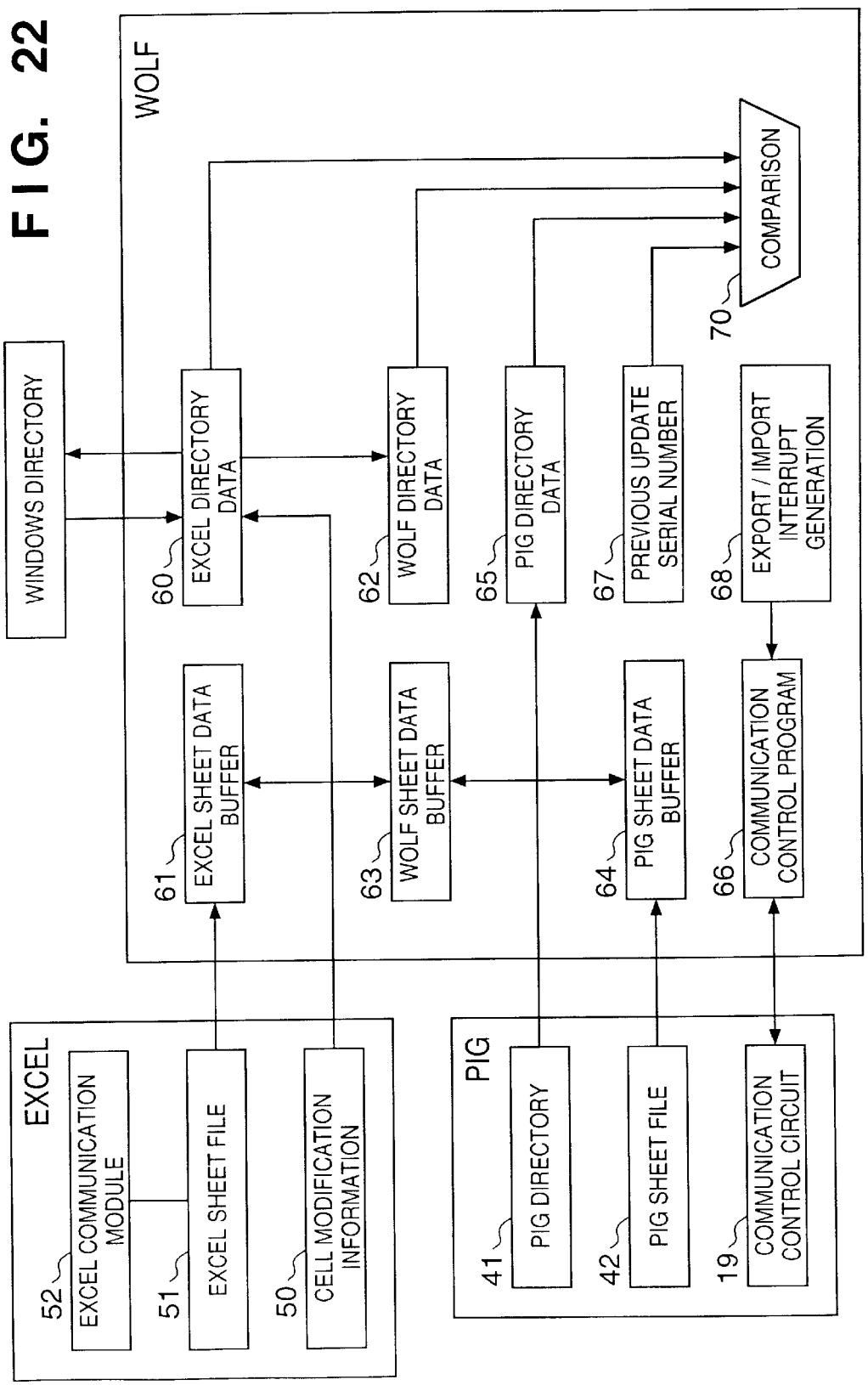
FIG. 22 is a block diagram showing the arrangement of the second embodiment.

The operation of the second embodiment will be explained below in association with FIG. 22. Data in the EXCEL buffer 61 that reflects modified data is exported to the EXCEL file 51 to reflect the modification in the EXCEL file. Based on this modification, a calculation module 52 of the EXCEL makes a calculation, and stores the result in the EXCEL file 51. In addition, the calculated file is imported to the WOLF by removing attributes. The imported file is stored in the EXCEL buffer 61 in the memory field in the WOLF. The calculated common file stored in the EXCEL buffer 61 is transferred to the PIG buffer 64 of the WOLF to reflect modified data. The recalculated data in the PIG buffer 64 is downloaded to the PIG.

Figure 23:
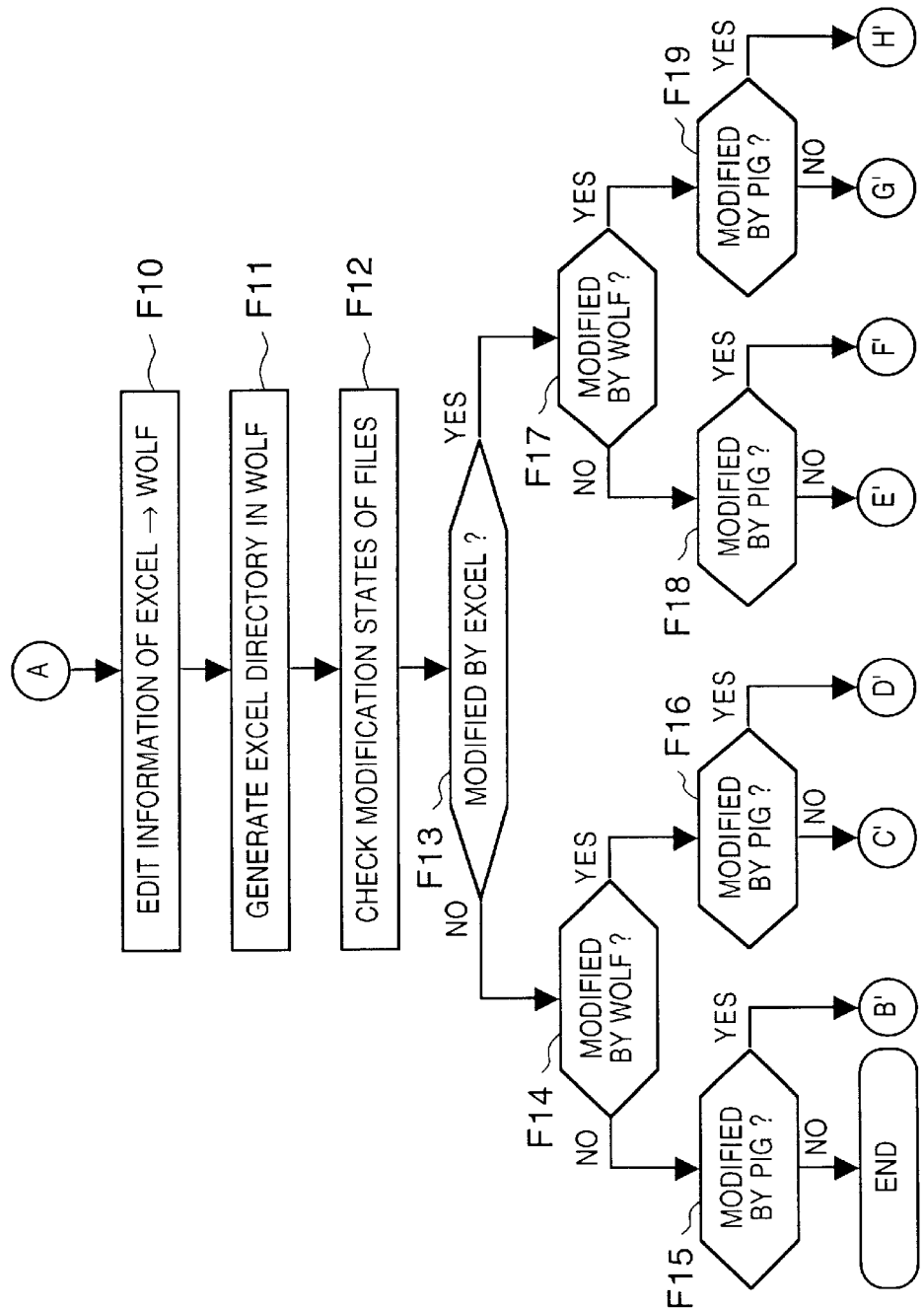
FIG. 23 is a flow chart showing the control sequence of the second embodiment.
Figure 24:
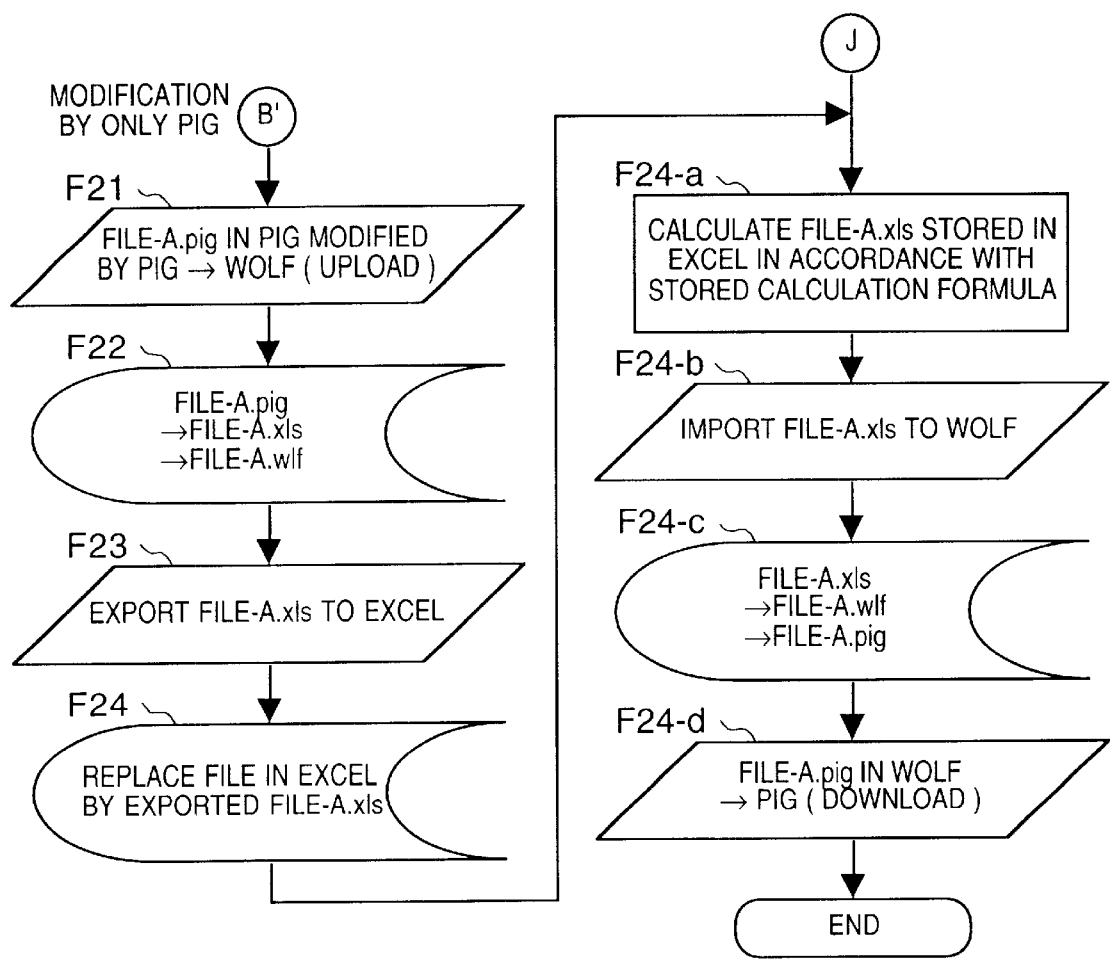
FIG. 24 is a flow chart showing the control sequence of the second embodiment.
Figure 25:
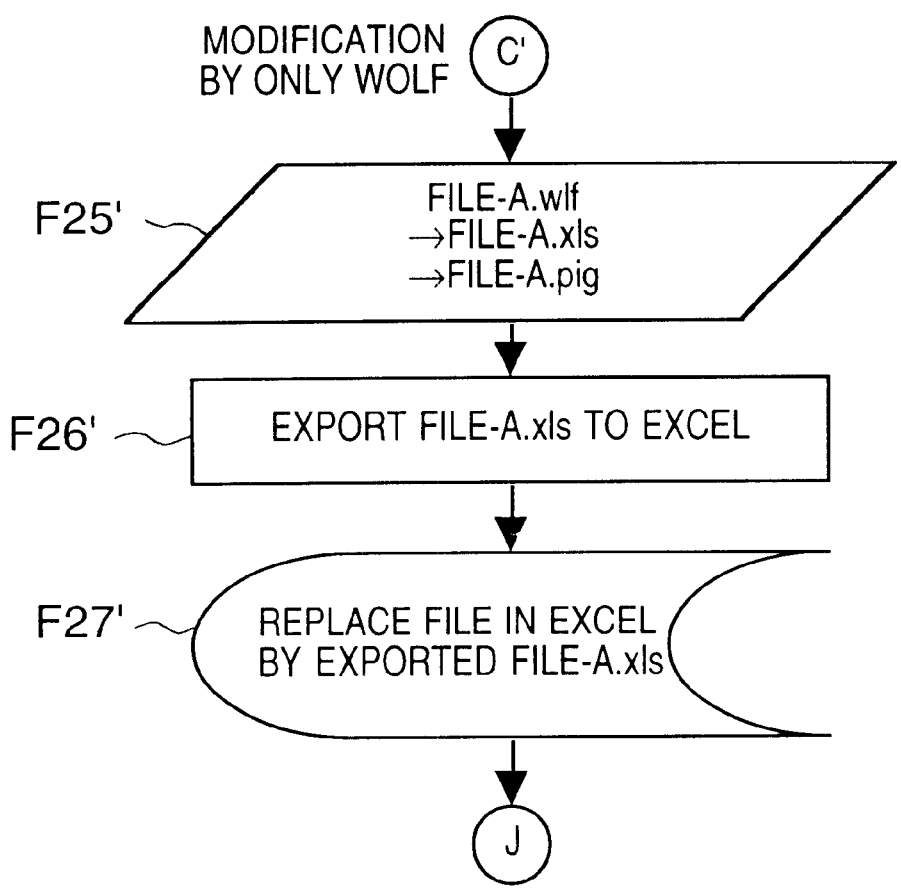
FIG. 25 is a flow chart showing the control sequence of the second embodiment.
Figure 26:
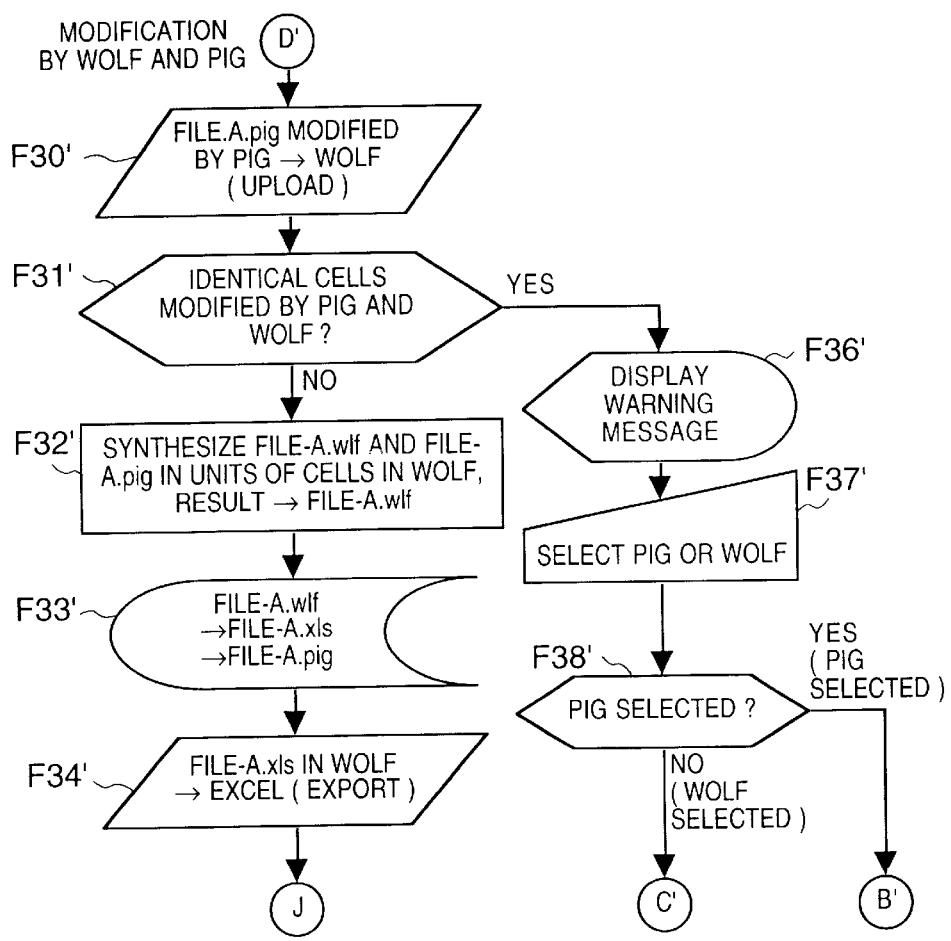
FIG. 26 is a flow chart showing the control sequence of the second embodiment.
Figure 27:
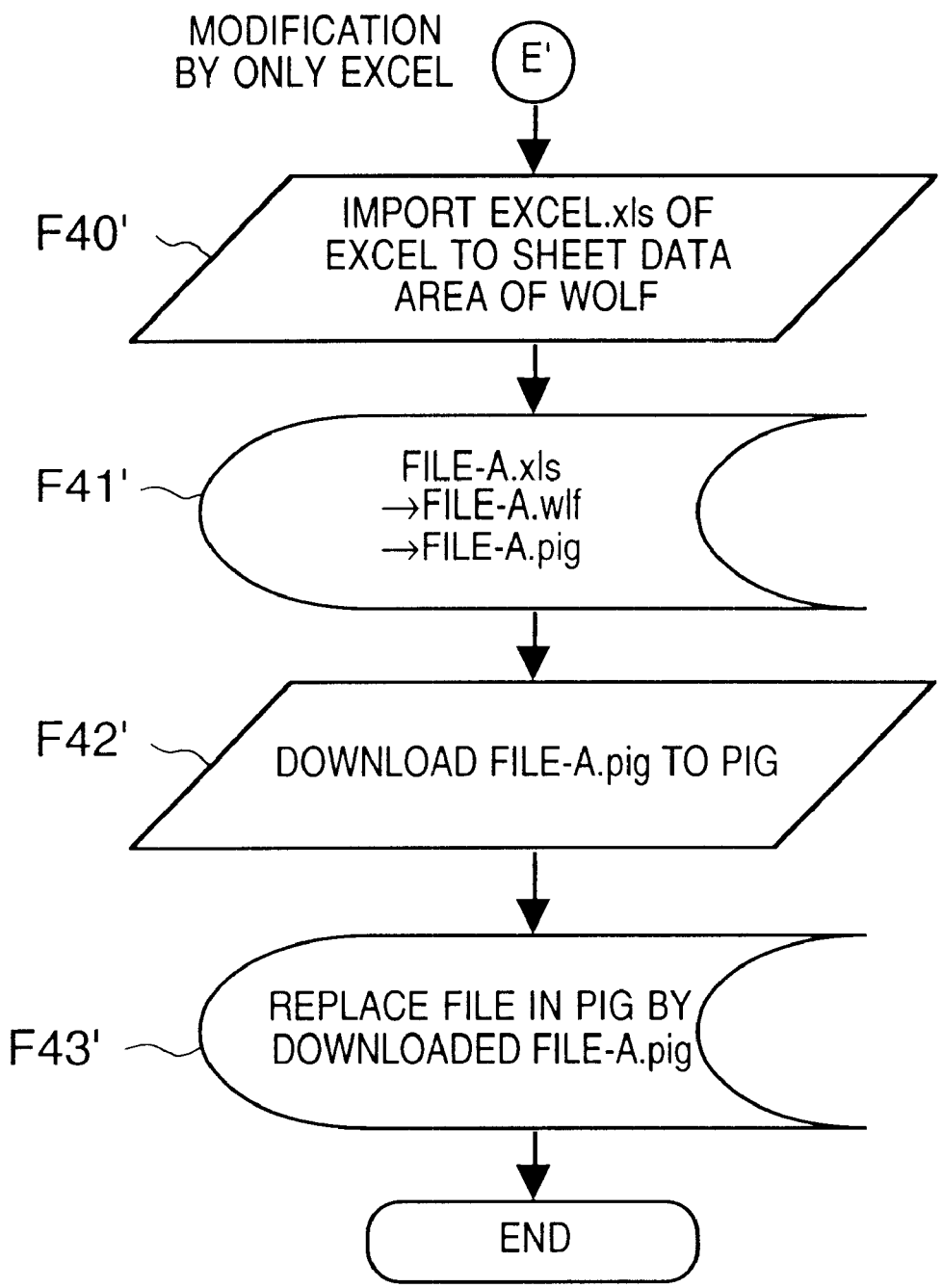
FIG. 27 is a flow chart showing the control sequence of the second embodiment.
Figure 28:
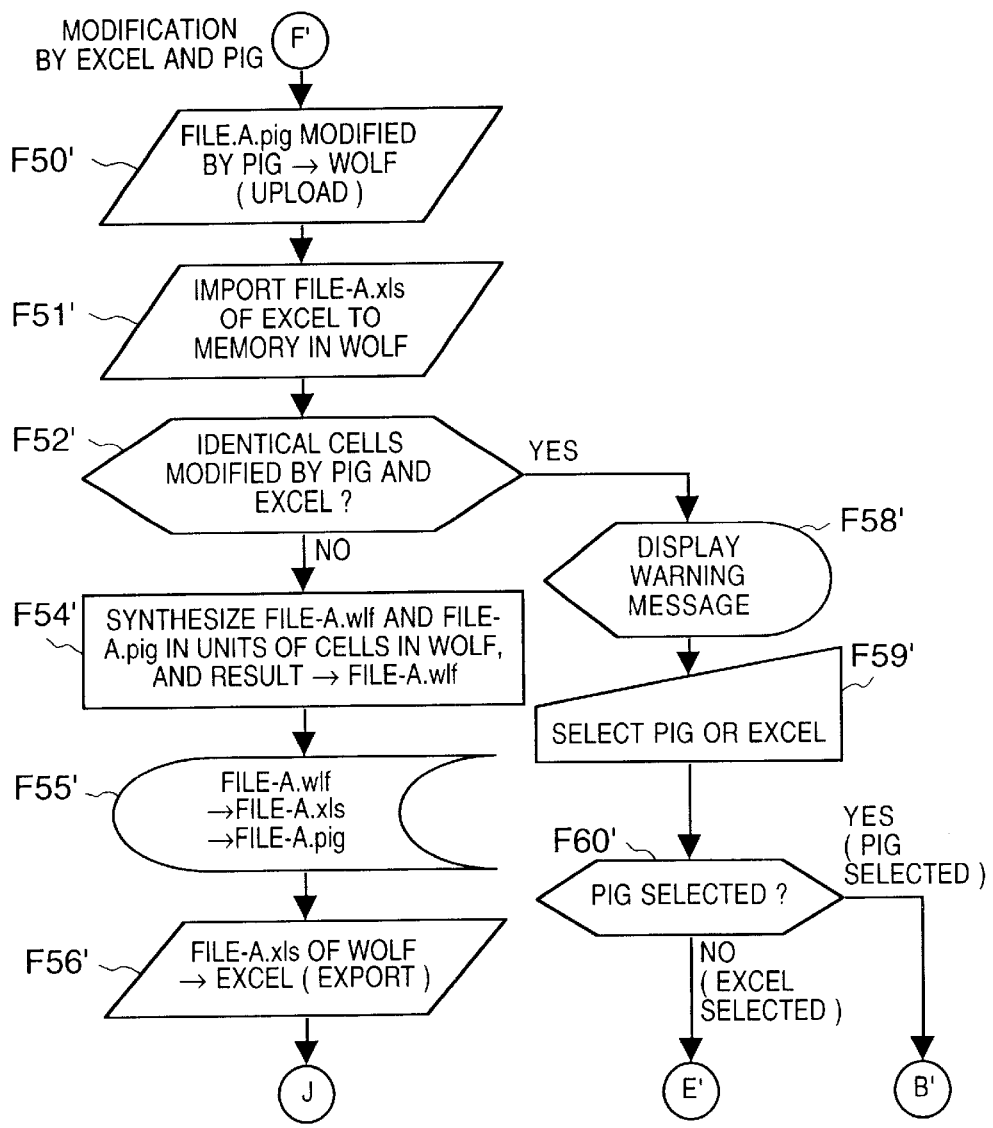
FIG. 28 is a flow chart showing the control sequence of the second embodiment.
Figure 29:
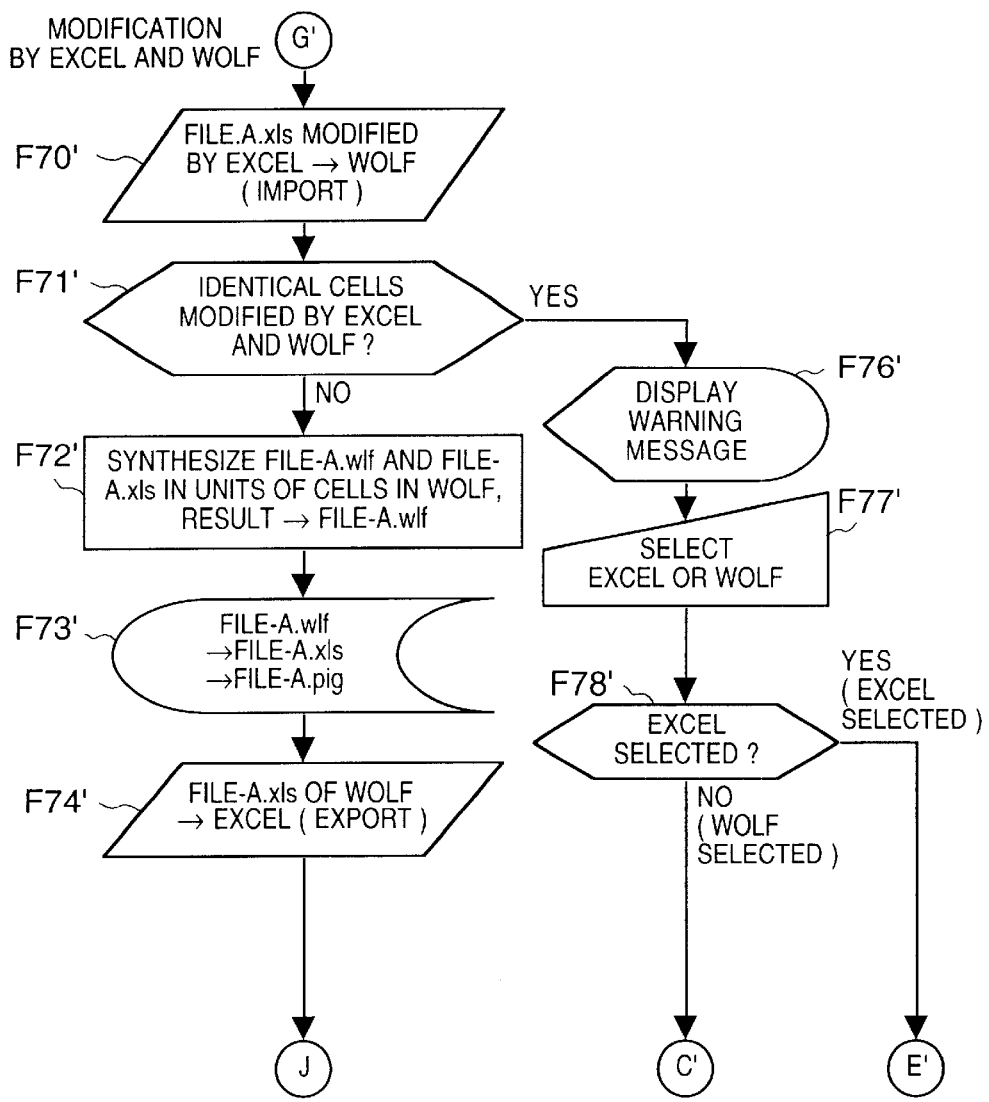
FIG. 29 is a flow chart showing the control sequence of the second embodiment.
Figure 30:
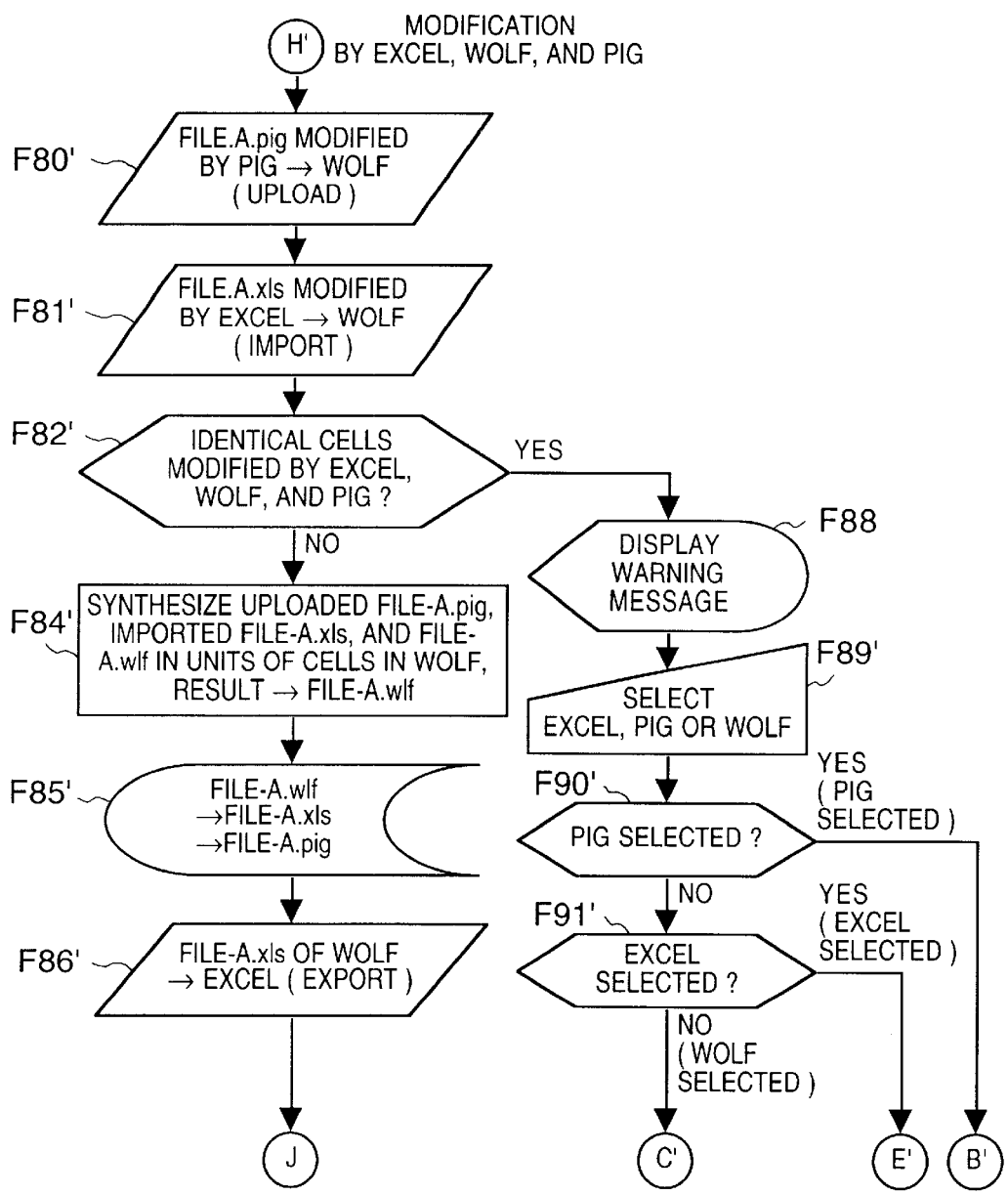
FIG. 30 is a flow chart showing the control sequence of the second embodiment.

The control sequences of the second embodiment are shown in FIGS. 23 to 30. Of the control sequences of the first embodiment, the control sequence of the second embodiment, which corresponds to that for recognizing start and a common file to be updated in both the PIG and PC, is the same as that shown in FIG. 12 of the first embodiment, a detailed description thereof will be omitted. The control sequences of the second embodiment are shown in FIGS. 23 to 29, and the control sequences shown in these figures are similar to those shown in FIGS. 13 to 20 of the first embodiment. That is, these figures respectively correspond to:

| Second Embodiment | First Embodiment |
| --- | --- |
| FIG. 23 | FIG. 13 |
| FIG. 24 | FIG. 14 |
| FIG. 25 | FIG. 15 |
| FIG. 26 | FIG. 16 |
| FIG. 27 | FIG. 17 |
| FIG. 28 | FIG. 18 |
| FIG. 29 | FIG. 19 |
| FIG. 30 | FIG. 20 |

The control sequence unique to the second embodiment corresponds to the processes shown in steps F24-a to F24-d in FIG. 24. FIGS. 24 to 30 describe the processes when modifications are made by the PIG, WOLF, . . . , and the processes in steps F24-a to F24-d calculate calculation formulas of the EXCEL in these processes. In the sequences other than [modification by only PIG], e.g., in the [modifications by WOLF and PIG] in FIG. 26, the flow jumps from step S34' to step F24-a in FIG. 24, thus executing the processes in steps F24-a to F24-d. Hence, the operations of the second embodiment suffice to be explained when the processes in steps F24-a to F24-d are explained.

In step F24-a, calculations are redone on the basis of calculation formulas stored in units of rows and columns in FILE-A.xls that stores the changed contents, and calculated file FILE-A.xls is stored.

In step F24-b, calculated FILE-A.xls is imported from the EXCEL to the WOLF, and is stored in the EXCEL buffer 61 in the WOLF.

FILE-A.xls in the EXCEL buffer 61 is transferred to FILE-A.wlf and FILE-A.pig in the PIG buffer in step F24-c, and FILE-A.pig is downloaded to the PIG in step F24-d.

With the above processes, data of FILE-A.pig which has been modified by the PIG is reflected in the EXCEL and WOLF, and the recalculation result of the EXCEL as the characteristic feature of this embodiment can be transferred to the WOLF and returned to the PIG.

<Third Embodiment>

In the third embodiment, file control of the present invention is applied to a digital camera and a portable information terminal.

Figure 31:
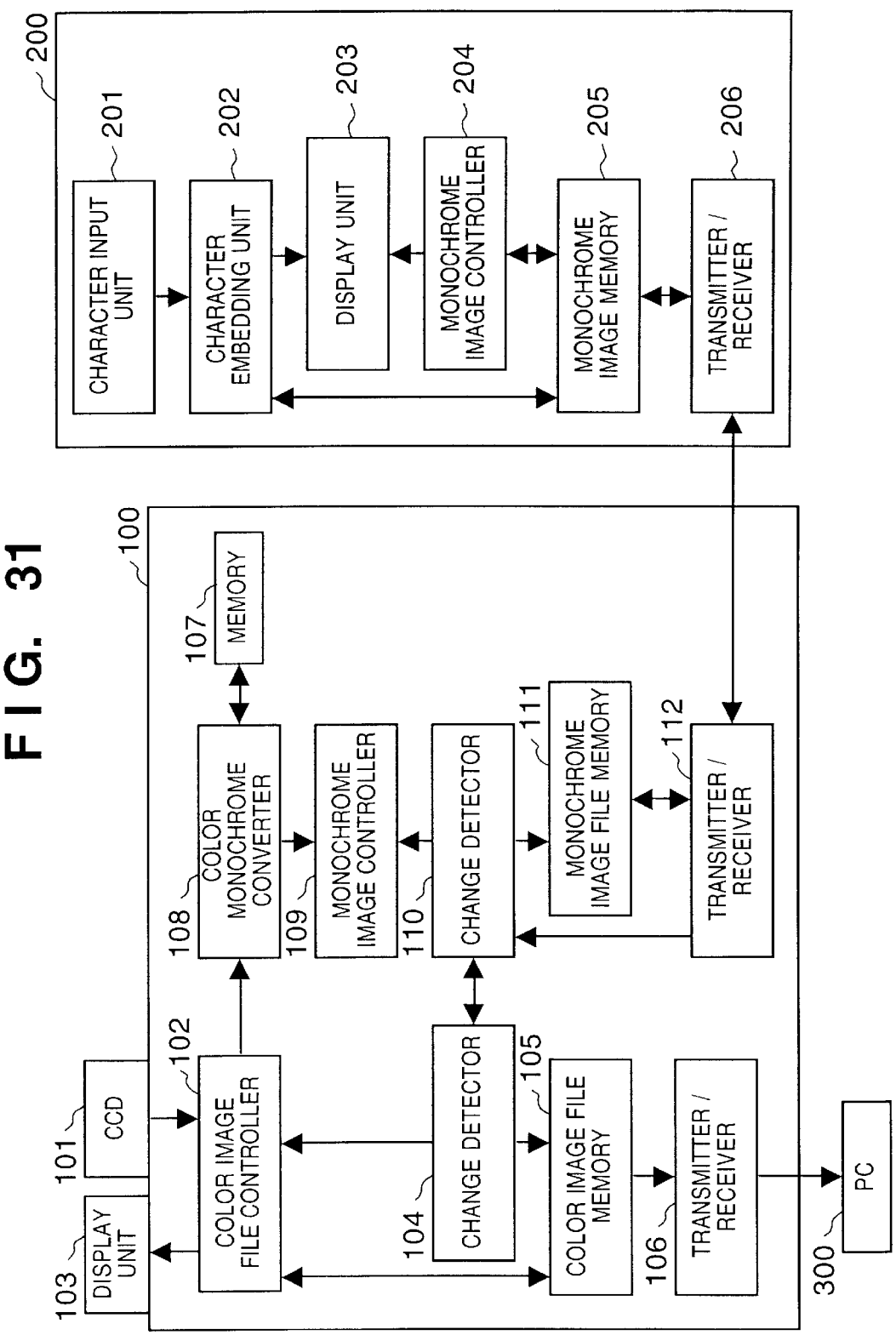
FIG. 31 is a diagram showing the arrangement of a file processing system in the third embodiment.

FIG. 31 is a block diagram showing the functions of a digital camera 100 and terminal apparatus 200.

The digital camera 100 captures a color image, writes it in a digital memory, and can then send the written image to an external apparatus as an image file. As will be described later, the camera 100 has a display unit 103 for storing and displaying a color image, monochrome image, and character data appended to externally received data.

On the other hand, the portable terminal apparatus 200 receives monochrome image file data from the digital camera 100, and can store and display character data input from a character input unit 201 in association with the monochrome image file data input from the camera.

A PC 300 receives color image file data from the camera 100, and can control, process, edit, and display that file.

The digital camera 100 has the following arrangement.

A CCD 101 converts an image input via an imaging lens into digital data.

A color image file controller 102 stores in a color image file memory 105 the digital image data by converting it into a file via compression control and the like, and processes the digital image data, so that the display unit 103 can display a color image.

A change detector 104 is a change portion detection means 1, which detects a change portion on a file received from a monochrome image file transmitter/receiver 112, and reflects the detected change portion on a color image file.

A transmitter/receiver 106 transmits a color image file stored in the color image file memory 105 to the PC 300.

A converter 108 converts a color image into a monochrome image, associates the original color image file and the converted monochrome image file, and stores their association in a memory 107.

A monochrome image controller 109 compresses a monochrome image generated by the converter 108 to reduce its size, and stores the compressed monochrome image in a monochrome image file memory 111.

A detector 110 detects a change portion on a file received by the monochrome image file transmitter/receiver 112, and reflects it on a monochrome image file.

The transmitter/receiver 112 receives a transmission/reception command from the portable terminal 200, then receives a directory that stores the file numbers, change histories, and the like of image files stored in the portable terminal, and detects the presence/absence of a new image file and the presence/absence of a changed image file on the basis of the contents of the received directory.

In the information apparatus 200, the character input unit 201 inputs data to be appended to image information, e.g., the name, address, telephone number, and the like on a name card.

A character embedding unit 202 embeds character information input by the input unit 201 on a surrounding portion of a monochrome or color image, displays an image file with the embedded character information on a display unit 203, and stores it in a monochrome image file memory 205.

Also, a process for storing data indicating that file contents have been changed in a file history field in the directory where file information of an image file is managed is executed.

The display unit 203 displays a monochrome image with character information in accordance with its file format under the control of the character embedding unit 202 and a monochrome image controller 204.

The controller 204 converts image data of a monochrome image file received from the digital camera via a data transmitter/receiver 206 into a file format of the portable apparatus, enlarges/reduces the image as needed, displays the image on the display unit 203, and stores the image in the memory 205.

The memory 205 is controlled by the controller 204, and stores an image file, which is captured by the digital camera 100, and has undergone monochrome conversion, compression, line reduction, and so on to reduce its storage size.

The data transmitter/receiver 206 transmits the directory having information of each file, and also transmits an image file with character information, obtained by appending and changing received character information to a new image file.

Figure 32:
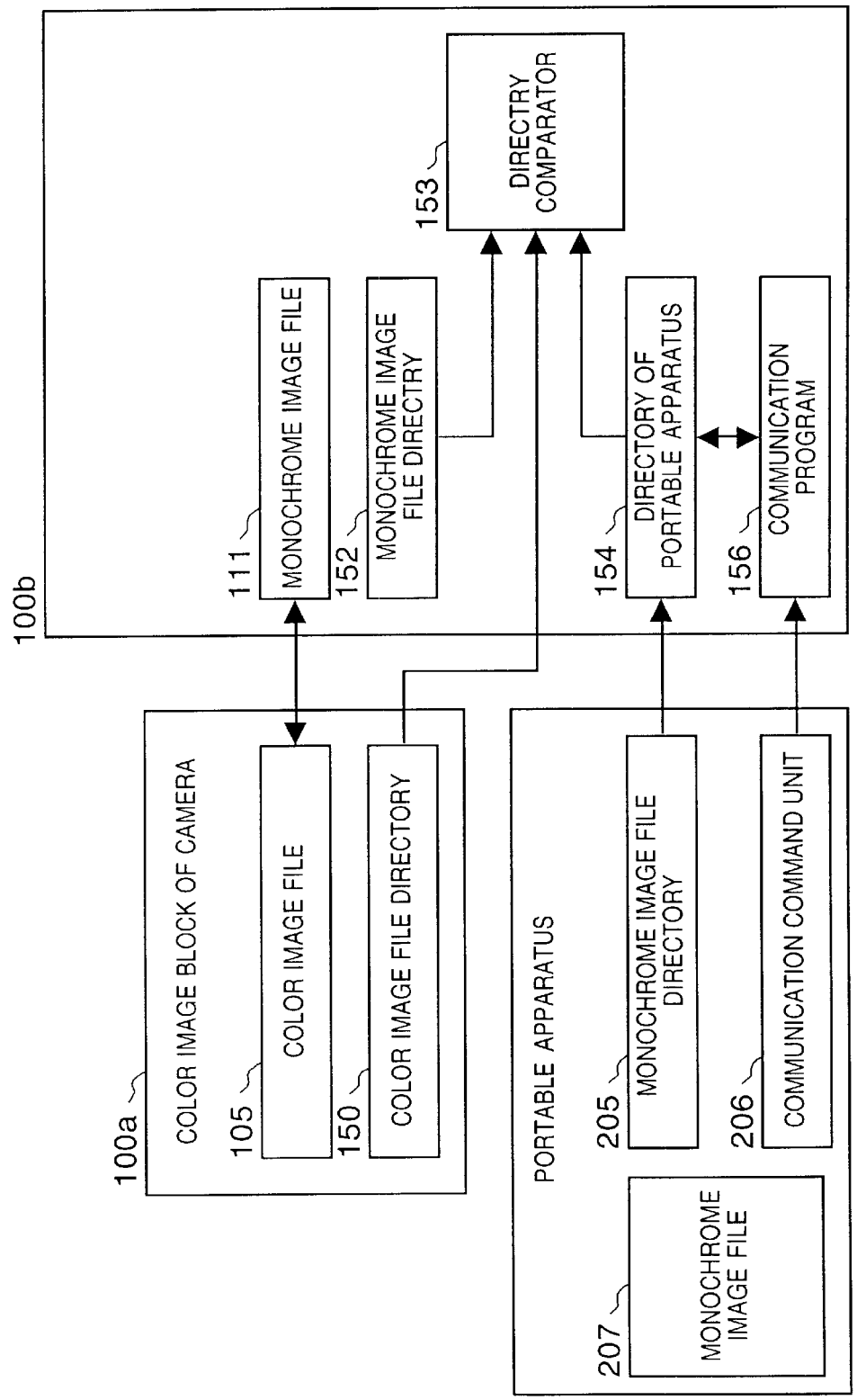
FIG. 32 is a block diagram showing the directory structure in the third embodiment.

FIG. 32 shows a method of detecting modifications of an image file by a color image block 100a and monochrome image block 100b of the digital camera, and a monochrome image block of the portable apparatus.

Referring to FIG. 32, when the portable apparatus 200 issues a data transmission/reception command, the digital camera 100 exchanges a permission response of a communication under the control of a communication control program. After that, to detect a data modification state, a monochrome image file directory 206 of the portable apparatus is sent to the digital camera 100, and is stored in a memory as a directory 154 of the portable apparatus.

A directory comparator 153 compares the contents of a color image file directory 150, monochrome image file directory 152, and the directory 154 of the portable apparatus, and generates a detection result, i.e., a change history. In this case, the monochrome image file 111 is generated based on a new color image file 105, and data in the file is transmitted to be stored in the monochrome image file memory 205 in the portable apparatus.

A changed image file (205) embedded with character information in the portable apparatus is sent to the digital camera 100, and is stored in the memory 111. The change portion of that file is detected, and is reflected in the color image file 105.

As described above, according to the third embodiment, the following effects are obtained.

I: Image data from the digital camera can be stored in the memory in the portable apparatus by only pressing a DATA SYNC button on the portable apparatus as a terminal apparatus.

II: Since image data stored in the digital camera is simplified by converting it into monochrome data, its storage capacity can be reduced, thus saving the memory size upon storing the image data in the portable apparatus.

III: Since image processes such as image compression, monochrome conversion, and the like, and processes such as change portion detection and the like upon data transmission/reception are done on only the digital camera side, the size of the memory storing a processing program in the portable apparatus can be reduced.

IV: Since files are managed based on directories in the color and monochrome blocks of the digital camera, and the portable apparatus, and modifications of files are detected by comparing the directories. Hence, modifications can be easily detected.

<Fourth Embodiment>

The fourth embodiment is different from the third embodiment in that the digital camera stores and displays a color image, monochrome image, and character data appended to externally received data while pasting (superimposing) it on an image.

The operation of the fourth embodiment will be explained below with reference to FIG. 34.

STEP 400:

A color image is captured by the digital camera.

STEP 401:

The color image is compressed using a compression technique such as JPEG or the like, and is stored as FILE-A in a memory.

STEP 402:

FILE-A is converted into monochrome data to express an image like an illustration, thereby increasing the compression ratio of the stored image. Then, that file is stored as monochrome FILE-A.

STEP 403:

While the digital camera is connected to the portable apparatus via a cable, FILE-A of the monochrome image is downloaded from the digital camera to the portable apparatus by pressing a data communication button on the portable apparatus. Downloaded FILE-A is stored in the portable apparatus.

STEP 404:

Character information that pertains to the monochrome image of FILE-A is input using a keyboard or touch panel to generate modified FILE-A. This process assumes a case wherein an image captured by the digital camera, and personal information written on a name card are input in association with each other, and after a process (to be described later) for pasting (superposing) the input information on the image in a specific format is done by the digital camera, the processed image is managed by the portable apparatus, or a case wherein an icon name or the like which pertains to an associated date, photographing location, catch phrase, or the like of an image captured by the digital camera is input, and after a process (to be described later) for pasting (superposing) characters or an image such as an icon on the image in a specific format is done by the digital camera, the image is printed or managed by the portable apparatus.

STEP 405:

After character information which pertains to FILE-A as image data is input in step 404, as described above, and is additionally stored as attribute information of FILE-A, modified FILE-A is uploaded to the digital camera so as to be processed by the digital camera by pressing a data communication button on the portable apparatus while the digital camera is connected to the portable apparatus via a cable.

STEP 406:

FILE-A stored in the monochrome image block of the digital camera is compared with modified FILE-A uploaded from the portable apparatus to detect if attribute character information is appended to FILE-A in the portable apparatus. The detection contents are sent to the color image block.

STEP 407:

The color image block of the digital camera receives the additional portion of the attribute character information of FILE-A, and pastes (superimposes) the character information on the color image or its surrounding portion in a predetermined format. In this manner, various kinds of associated character information can be pasted on images.

STEP 408:

The color image block of the digital camera receives an additional portion of image associated information of FILE-A by the process in step 406, and an illustration icon or the like of an image designated by a character string in the predetermined format is pasted (superimposed) on the color image. In this manner, various kinds of image information can be pasted on images.

STEP 409:

Image file FILE-A superimposed with attribute information in steps 407 and 408 is stored.

STEP 410:

The size of FILE-A of the color image superimposed with attribute information in steps 407 and 408 is reduced by the monochrome converter, and the converted file is stored in the memory.

STEP 411:

FILE-A, on which attribute information is superimposed, and which has undergone monochrome conversion to reduce its size, is downloaded to and stored in the portable apparatus.

In the characteristic feature of this embodiment, when the portable apparatus outside the digital camera issues a data communication command, the processes in steps 405 to 411 are done, and image file FILE-A on which a character string or image in the predetermined format is pasted (superimposed) in accordance with a character string input by the portable apparatus, can be stored in the color image block, monochrome image block, and the memory of the portable apparatus.

As described above, according to the present invention, in a first file apparatus such as a host apparatus or the like and a second file apparatus such as a portable information terminal or the like, when data has been updated in one or both of these apparatuses, the updated data can be reflected in files in both the apparatuses by a simple apparatus. Especially, a first file can be updated in a complete format.

As many apparently widely different embodiments of the present invention can be made without departing from the spirit and scope thereof, it is to be understood that the invention is not limited to the specific embodiments thereof except as defined in the appended claims.

What is claimed is:

1. A file control system which comprises first and second file apparatuses that can independently modify or edit data, and connection means for connecting said first and second file apparatuses as needed to be able to exchange data, comprising:

associating means, provided in said first file apparatus, for generating a third file for associating a first file stored in said first file apparatus with a second file stored in said second file apparatus;

detection means for detecting a data modification in the associated first and second files, and reflecting a detection result in the third file;

matching means for matching first data present in both the first and second files with each other based on the third file in which the detection result is reflected; and means for updating and modifying second data present in the first file based on the third file in which the detection result is reflected, wherein said first file apparatus comprises a disk device managed by a personal computer operating system of a personal computer apparatus, and said second file apparatus comprises a portable information terminal apparatus.

2. The system according to claim 1, wherein the first and second files are spreadsheet files having identical data structures.

3. The system according to claim 2, wherein modifications in units of cells in the first file are reflected in the third file.

4. The system according to claim 3, further comprising arranging means for, when the first and second files are changed at identical cell addresses, arranging a priority order of modifications of the first and second files.

5. The system according to claim 4, further comprising means for outputting a message indicating that the first and second files are changed at identical cell addresses.

6. The system according to claim 4, further comprising means for, when the first and second files are changed at identical cell addresses, outputting a message inquiring a priority order of modifications of the first and second files.

7. The system according to claim 1, wherein said associating means generates the third file when data of the first file is newly transferred to said second file apparatus via said connection means.

8. The system according to claim 1, wherein a first file control program can be executed in said first file apparatus, and a second file control program can be executed in said second file apparatus.

9. The system according to claim 1, wherein said detection means and said matching means are started by a start button provided to said second file apparatus.

10. The system according to claim 1, wherein said connection means includes a communication cable.

11. The system according to claim 1, wherein said detection means comprises:

a first management file which is provided in said first file apparatus to store first count information indicating a modification count of the first file in said first file apparatus;

a second management file which is provided in said first file apparatus to store second count information indicating a modification count of the second file in said second file apparatus; and means for checking a latest modified file by comparing the first count information and second count information.

12. The system according to claim 11, wherein said detection means comprises a register for storing count information upon previous matching.

13. The system according to claim 1, further comprising a file management program running in said first file apparatus, and wherein said file management program manipulates a first management information file for the first file, a second management information file for the second file, and a third management information file that mediates the first and second management information files.

14. The system according to claim 1, wherein the third file does not contain attribute information of data of the first file.

15. The system according to claim 1, wherein energization of said connection means is started by said second file apparatus.

16. The system according to any one of claims 1 and 2–6, wherein the second data is a calculation formula appended to the first data.

17. A personal computer apparatus used in a file control system recited in any one of claims 1 and 2–6, and having said first file apparatus.

18. A computer readable storage medium for storing a support program for a first data accumulation program for accumulating data, the program comprising:

a program code representing the step of managing a first file for storing first information, which reflects an accumulation result of accumulation data generated upon execution of the first data accumulation program on a computer;

a program code representing the step of externally receiving second information, which reflects an accumulation result of accumulation data generated in accordance with an execution result of an externally executed second data accumulation program, and managing the second information as a second file;

a program code representing the step of updating an output file of the first data accumulation program based on the first information and the second information;

a program code representing the step of further updating data of the output file in accordance with third information embedded in the first file;

a program code representing the step of generating update information for updating an external output file of the second data accumulation program based on the first information and the second information; and a program code representing the step of externally outputting the update information via a communication line.

19. The medium according to claim 18, further storing:

a program code representing the step of generating fourth information which mediates the first information and second information;

a program code representing the step of storing the fourth information; and a program code representing the step of generating data of the output file via the fourth information.

20. A file update method for supporting data update of a first data accumulation program for accumulating data, comprising:

the step of managing a first file for storing first information, which reflects an accumulation result of accumulation data generated upon execution of the first data accumulation program on a computer;

the step of externally receiving second information, which reflects an accumulation result of accumulation data generated in accordance with an execution result of an externally executed second data accumulation program, and managing the second information as a second file;

the step of updating an output file of the first data accumulation program based on the first information and the second information;

the step of further updating data of the output file in accordance with third information embedded in the first file;

the step of generating update information for updating an external output file of the second data accumulation program based on the first information and the second information; and and the step of externally outputting the update information via a communication line.

21. The method according to claim 20, further comprising:

the step of generating fifth information which mediates the first information and second information;

the step of storing the fifth information; and the step of generating the third information via the fifth information.

* * * * *

UNITED STATES PATENT AND TRADEMARK OFFICE
CERTIFICATE OF CORRECTION

PATENT NO.     : 6,421,685 B1
DATED          : July 16, 2002
INVENTOR(S)    : Hiroshi Nishikawa It is certified that error appears in the above-identified patent and that said Letters Patent is hereby corrected as shown below:

Column 2,
Line 4, "such" should read -- such a --.

Column 10,
Line 3, "not" should be deleted.
Line 34, "whose" should read -- who --; and "that" should read -- of how --.
Line 35, "do using" should read -- use --.

Column 13,
Line 31, "that data" should read -- data --.
Line 32, "is" should read -- being --, and "least" should read -- at least --.

Column 24,
Line 65, "claims 1 and 2-6," should read -- claims 1 to 15, --.

Column 25,
Line 2, "claims 1 and 2-6," should read -- claims 1 to 15, --.

Signed and Sealed this

Nineteenth Day of November, 2002

*Attest:*

JAMES E. ROGAN
*Director of the United States Patent and Trademark Office*

*Attesting Officer*